(12) United States Patent
Scott et al.

(10) Patent No.: US 11,801,502 B2
(45) Date of Patent: Oct. 31, 2023

(54) HYDROCYCLONE MODIFICATION OF CATALYST SYSTEM COMPONENTS FOR USE IN OLEFIN POLYMERIZATION

(71) Applicants: Chevron Phillips Chemical Company LP, The Woodlands, TX (US); The Shepherd Chemical Company, Norwood, OH (US)

(72) Inventors: Mark Scott, Fort Thomas, KY (US); Evan Merk, Cincinnati, OH (US); Carlos A. Cruz, Kingwood, TX (US); Mitchell D. Refvik, Bartlesville, OK (US); Max P. McDaniel, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 17/942,228

(22) Filed: Sep. 12, 2022

(65) Prior Publication Data
US 2023/0077442 A1 Mar. 16, 2023

Related U.S. Application Data

(60) Provisional application No. 63/243,228, filed on Sep. 13, 2021.

(51) Int. Cl.
*B01J 37/00* (2006.01)
*B01J 35/02* (2006.01)
*B01J 35/10* (2006.01)

(52) U.S. Cl.
CPC ......... *B01J 37/0045* (2013.01); *B01J 35/023* (2013.01); *B01J 35/1004* (2013.01)

(58) Field of Classification Search
CPC ... B01J 37/0045; B01J 35/023; B01J 35/1004
See application file for complete search history.

(56) References Cited

U.S. PATENT DOCUMENTS 3,242,099 A 3/1966 Manyik
3,910,870 A 10/1975 Lutze
(Continued)

FOREIGN PATENT DOCUMENTS

EP 0173834 A1 3/1986
EP 0522215 A2 1/1993
(Continued)

OTHER PUBLICATIONS

International Search Report and Written Opinion issued in related application No. PCT/US2022/076299, dated Feb. 23, 2023, 19 pp.
(Continued)

*Primary Examiner* — James A Fiorito
(74) *Attorney, Agent, or Firm* — Merchant & Gould P.C.

(57) ABSTRACT

Methods for modifying a catalyst system component are disclosed in which a feed mixture containing a fluid and from 1 to 15 wt. % of a catalyst system component is introduced into an inlet of a hydrocyclone, an overflow stream containing from 0.1 to 5 wt. % solids and an underflow stream containing from 10 to 40 wt. % solids are discharged from the hydrocyclone, and the underflow stream is spray dried to form a modified catalyst component. Often, from 4 to 20 wt. % of the catalyst system component in the feed mixture has a particle size of less than or equal to 20 µm, or less than or equal to 10 µm.

20 Claims, 2 Drawing Sheets

(56) References Cited

U.S. PATENT DOCUMENTS

| | | |
|---|---|---|
| 3,925,338 A | 12/1975 | Ort |
| 4,056,699 A | 11/1977 | Jordan |
| 4,060,480 A | 11/1977 | Reed |
| 4,148,766 A | 4/1979 | McClain |
| 4,405,495 A | 9/1983 | Lee |
| 4,405,496 A | 9/1983 | Hsu |
| 4,452,910 A | 6/1984 | Hopkins |
| 4,501,885 A | 2/1985 | Sherk |
| 4,714,553 A | 12/1987 | Crouzet |
| 4,737,271 A | 4/1988 | Childs |
| 4,794,096 A | 12/1988 | Ewen |
| 4,808,561 A | 2/1989 | Welborn, Jr. |
| 4,960,525 A | 10/1990 | Dalby |
| 5,122,490 A | 6/1992 | Uwai |
| 5,258,342 A | 11/1993 | Luciani |
| 5,376,611 A | 12/1994 | Shveima |
| 5,468,703 A | 11/1995 | Kioka |
| 5,565,175 A | 10/1996 | Hottovy |
| 5,575,979 A | 11/1996 | Hanson |
| 5,576,259 A | 11/1996 | Hasegawa |
| 5,641,842 A | 6/1997 | McDaniel |
| 5,648,309 A | 7/1997 | Bohm |
| 5,807,938 A | 9/1998 | Kaneko |
| 5,919,983 A | 7/1999 | Rosen |
| 6,107,230 A | 8/2000 | McDaniel |
| 6,165,929 A | 12/2000 | McDaniel |
| 6,239,235 B1 | 5/2001 | Hottovy |
| 6,262,191 B1 | 7/2001 | Hottovy |
| 6,294,494 B1 | 9/2001 | McDaniel |
| 6,300,271 B1 | 10/2001 | McDaniel |
| 6,313,061 B1 | 11/2001 | Denton |
| 6,316,553 B1 | 11/2001 | McDaniel |
| 6,355,594 B1 | 3/2002 | McDaniel |
| 6,376,415 B1 | 4/2002 | McDaniel |
| 6,388,017 B1 | 5/2002 | McDaniel |
| 6,391,816 B1 | 5/2002 | McDaniel |
| 6,395,666 B1 | 5/2002 | McDaniel |
| 6,420,497 B1 | 7/2002 | Kufeld |
| 6,524,987 B1 | 2/2003 | Collins |
| 6,548,441 B1 | 4/2003 | McDaniel |
| 6,548,442 B1 | 4/2003 | McDaniel |
| 6,576,583 B1 | 6/2003 | McDaniel |
| 6,613,712 B1 | 9/2003 | McDaniel |
| 6,617,278 B1 | 9/2003 | Jin |
| 6,632,894 B1 | 10/2003 | McDaniel |
| 6,667,274 B1 | 12/2003 | Hawley |
| 6,699,947 B1 | 3/2004 | Evertz |
| 6,716,924 B2 | 4/2004 | Tsutsui |
| 6,716,938 B2 | 4/2004 | Shveima |
| 6,750,302 B1 | 6/2004 | McDaniel |
| 6,806,222 B2 | 10/2004 | Yashiki |
| 6,833,415 B2 | 12/2004 | Kendrick |
| 7,026,494 B1 | 4/2006 | Yang |
| 7,041,617 B2 | 5/2006 | Jensen |
| 7,045,478 B2 | 5/2006 | Yang |
| 7,091,289 B2 | 8/2006 | Wang |
| 7,199,071 B2 | 4/2007 | Zheng |
| 7,199,073 B2 | 4/2007 | Martin |
| 7,223,823 B2 | 5/2007 | Lin |
| 7,226,886 B2 | 6/2007 | Jayaratne |
| 7,276,566 B2 | 10/2007 | Muruganandam |
| 7,294,599 B2 | 11/2007 | Jensen |
| 7,312,283 B2 | 12/2007 | Martin |
| 7,354,981 B2 | 4/2008 | Xiao |
| 7,381,780 B2 | 6/2008 | Apecetche |
| 7,517,939 B2 | 4/2009 | Yang |
| 7,601,665 B2 | 10/2009 | McDaniel |
| 7,619,047 B2 | 11/2009 | Yang |
| 7,632,907 B2 | 12/2009 | Sukhadia |
| 7,867,939 B2 | 1/2011 | Xiao |
| 7,884,163 B2 | 2/2011 | McDaniel |
| 8,114,946 B2 | 2/2012 | Yang |
| 8,124,708 B2 | 2/2012 | Ameye |
| 8,268,945 B2 | 9/2012 | Zhang |
| 8,309,485 B2 | 11/2012 | Yang |
| 8,445,619 B2 | 5/2013 | Ameye |
| 8,623,973 B1 | 1/2014 | McDaniel |
| 8,633,286 B2 | 1/2014 | Kuo |
| 8,680,218 B1 | 3/2014 | Yang |
| 8,703,886 B1 | 4/2014 | Yang |
| 8,822,608 B1 | 9/2014 | Bhandarkar |
| 8,912,285 B2 | 12/2014 | Yang |
| 8,957,168 B1 | 2/2015 | Yang |
| 8,987,390 B2 | 3/2015 | Bhandarkar |
| 8,993,692 B2 | 3/2015 | Jorgensen |
| 9,000,113 B2 | 4/2015 | Fantinel |
| 9,006,367 B2 | 4/2015 | McDaniel |
| 9,023,959 B2 | 5/2015 | McDaniel |
| 9,034,994 B2 | 5/2015 | McDaniel |
| 9,034,999 B2 | 5/2015 | Robert |
| 9,068,025 B2 | 6/2015 | Wang |
| 9,079,993 B1 | 7/2015 | St. Jean |
| 9,115,280 B2 | 8/2015 | Jan |
| 9,156,970 B2 | 10/2015 | Hlavinka |
| 9,169,337 B2 | 10/2015 | Rohatgi |
| 9,181,370 B2 | 11/2015 | Sukhadia |
| 9,234,060 B2 | 1/2016 | Kao |
| 9,284,389 B2 | 3/2016 | St. Jean |
| 9,321,857 B2 | 4/2016 | Li |
| 9,340,631 B2 | 5/2016 | Willocq |
| 9,403,921 B2 | 8/2016 | Bhandarkar |
| 9,493,589 B1 | 11/2016 | Greco |
| 9,540,457 B1 | 1/2017 | Ding |
| 9,540,460 B2 | 1/2017 | Lester |
| 9,556,288 B2 | 1/2017 | Bhandarkar |
| 9,644,049 B2 | 5/2017 | Jorgensen |
| 9,758,600 B1 | 9/2017 | Praetorius |
| 10,100,135 B2 | 10/2018 | Vantomme |
| 10,144,788 B2 | 12/2018 | Gerrits |
| 10,246,566 B2 | 4/2019 | Kikuchi |
| 10,358,513 B2 | 7/2019 | Klendworth |
| 10,590,213 B2 | 3/2020 | Rohatgi |
| 10,604,603 B2 | 3/2020 | Dreng |
| 10,703,648 B2 | 7/2020 | Norum |
| 10,730,969 B2 | 8/2020 | Sakai |
| 11,015,001 B2 | 5/2021 | Ye |
| 11,123,726 B2 | 9/2021 | Munro |
| 11,124,586 B1 | 9/2021 | McDaniel |
| 11,208,513 B2 | 12/2021 | Brandl |
| 11,325,997 B1 | 5/2022 | McDaniel |
| 11,326,005 B1 | 5/2022 | McDaniel |
| 11,420,196 B2 | 8/2022 | Mcdaniel |
| 11,492,430 B2 | 11/2022 | Mcdaniel |
| 2003/0109651 A1 | 6/2003 | Kufeld |
| 2006/0094835 A1 | 5/2006 | Fouarge |
| 2007/0197374 A1 | 8/2007 | Yang |
| 2009/0143546 A1 | 6/2009 | Fouarge |
| 2009/0318643 A1 | 12/2009 | Chen |
| 2011/0130271 A1 | 6/2011 | Wagner |
| 2011/0165419 A1 | 7/2011 | Kumamoto |
| 2012/0202955 A1 | 8/2012 | Zhang |
| 2013/0046040 A1 | 2/2013 | Srinivasan |
| 2013/0115461 A1 | 5/2013 | Jan |
| 2014/0004339 A1 | 1/2014 | Ehlers |
| 2014/0316082 A1 | 10/2014 | Kolling |
| 2015/0166697 A1 | 6/2015 | Vantomme |
| 2015/0368377 A1 | 12/2015 | Lester |
| 2018/0105621 A1 | 4/2018 | Gupta |
| 2018/0273699 A1 | 9/2018 | Kalyanaraman |
| 2019/0185594 A1 | 6/2019 | Dreng |
| 2020/0071438 A1 | 3/2020 | Brandl |
| 2020/0123279 A1 | 4/2020 | Kanellopoulos |
| 2020/0270383 A1 | 8/2020 | Dreng |
| 2021/0269560 A1 | 9/2021 | Krallis |
| 2022/0153887 A1 | 5/2022 | McDaniel |
| 2022/0227897 A1 | 7/2022 | McDaniel |
| 2022/0403075 A1 | 12/2022 | Mcdaniel |

FOREIGN PATENT DOCUMENTS

| | | |
|---|---|---|
| EP | 1713834 B1 | 4/2010 |
| EP | 3331924 B1 | 8/2019 |
| EP | 2877502 B1 | 11/2019 |
| WO | 2014016418 A1 | 1/2014 |

(56) References Cited

FOREIGN PATENT DOCUMENTS

| WO | 2014099411 A1 | 6/2014 |
|---|---|---|
| WO | 2015197435 A1 | 12/2015 |
| WO | 2016002513 A1 | 1/2016 |
| WO | 2020025757 A1 | 2/2020 |
| WO | 2020109452 A1 | 6/2020 |
| WO | 2022099250 A2 | 5/2022 |
| WO | 2022125581 A2 | 6/2022 |

OTHER PUBLICATIONS

Partial Search Report issued in corresponding application No. PCT/US2022/076299, dated Dec. 20, 2022, 2 pp.
Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
Brunauer, et al., "Adsorption of Gases in Multimolecular Layers," Journal of the American Chemical Society. 1938, vol. 60, pp. 309-319.
Cotton, F. Albert, et al., "Advanced Inorganic Chemistry," Sixth Edition, cover page, title page, pp. ix-x, and book description, Mar. 30, 1999, John Wiley & Sons, Inc.
Film Extrusion Manual—Process, Materials, Properties, TAPPI Press, 1992, 16 pages.
George Halsey, "Physical Adsorption on Non-Uniform Surfaces," Journal Chem. Phys., vol. 16, Mar. 9, 1948, pp. 931-937.
Hawley's Condensed Chemical Dictionary, Eleventh Edition, cover page, contents page, pp. 862-863, Van Nostrand Reinhold Company.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
IUPAC Compendium of Chemical Terminology, 2nd Ed. 1997, pp. 1-1670.
Janzen, et al., "Diagnosing Long-Chain Branching in Polyethylene," Journal of Mol. Struct., 485/486, 1999, pp. 569-584.
John Landers, et al., "Density Functional Theory Methods for Characterization of Porous Materials," Colloids and Surfaces A: Physicochemical and Engineering Aspects, 437, 2013, pp. 3-32.
Marsden Ce: "Advances in Supported Chromium Catalysts", Plastics, Rubber and Composites Processing and Applications, Essex, GB, vol. 21, No. 4, Jan. 1, 1994 (Jan. 1, 1994), pp. 193-200, XP008057615.
Max P McDaniel: "Review of Phillips Chromium Catalyst for Ethylene Polymerization (Chapter 10)" In: "Handbook of Transition Metal Polymerization Catalysts", Aug. 31, 2010 (Aug. 31, 2010), Wiley, US, XP055562084, ISBN: 978-1-119-24213-0 pp. 291-446.
Modern Plastics Encyclopedia, Mid-Nov. 1995 Issue, vol. 72, No. 12, 3 pages.
Pinnavaia, Thomas J., "Intercalated Clay Catalysts," Apr. 22, 1983, pp. 365-371, vol. 220, No. 4595, Science.
Thomas, J. M., "Sheet Silicate Intercalates: New Agents for Unusual Chemical Conversions," Intercalation Chemistry, 1982, Chapter 3, pp. 55-99, Academic Press, Inc.

HYDROCYCLONE MODIFICATION OF CATALYST SYSTEM COMPONENTS FOR USE IN OLEFIN POLYMERIZATION

REFERENCE TO RELATED APPLICATION

This application claims the benefit of U.S. Provisional Patent Application No. 63/243,228, filed on Sep. 13, 2021, the disclosure of which is incorporated herein by reference in its entirety.

FIELD OF THE INVENTION

The present disclosure generally relates to methods for modifying the particle size distribution of catalyst system components using one or more hydrocyclones.

BACKGROUND OF THE INVENTION

Improper particle size features of catalyst system components used in catalyst compositions—such as metallocene, Ziegler-Natta, and chromium catalyst compositions—can lead to operational difficulties during olefin-based polymerizations in loop slurry reactors and fluidized bed reactors, as well as poor and inconsistent properties of the resulting olefin polymer. It would be beneficial to develop methods for modifying catalyst system components that overcome these drawbacks. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

A first method consistent with an aspect of this invention can comprise (i) introducing a feed mixture containing a fluid and from 1 to 15 wt. % of a catalyst system component into an inlet of a hydrocyclone, wherein from 4 to 20 wt. % of the catalyst system component has a particle size of less than or equal to 20 μm, (ii) discharging from the hydrocyclone an overflow stream containing from 0.1 to 5 wt. % solids and an underflow stream containing from 10 to 40 wt. % solids, and (iii) spray drying the underflow stream to form a modified catalyst component.

In another aspect of this invention, a second method can comprise (I) introducing a feed mixture containing a fluid and from 1 to 15 wt. % of a catalyst system component having a wet particle density of from 1.05 to 2.0 g/cc into an inlet of a hydrocyclone at a linear velocity of from 2 to 20 ft/sec (0.6 to 6.1 m/sec), wherein from 4 to 20 wt. % of the catalyst system component has a particle size of less than or equal to 20 μm, and (II) discharging from the hydrocyclone an overflow stream containing from 0.1 to 5 wt. % solids and an underflow stream containing from 10 to 40 wt. % solids.

A third method in accordance with yet another aspect of this invention can comprise (a) introducing a feed mixture containing a fluid and from 1 to 15 wt. % of a catalyst system component into a first inlet of a first hydrocyclone, wherein from 4 to 20 wt. % of the catalyst system component has a particle size of less than or equal to 20 μm, (b) discharging from the first hydrocyclone a first overflow stream containing from 0.1 to 5 wt. % solids and a first underflow stream containing from 10 to 40 wt. % solids, (c) introducing the first overflow stream into a second inlet of a second hydrocyclone, and (d) discharging from the second hydrocyclone a second overflow stream containing from 0.05 to 2.5 wt. % solids and a second underflow stream containing from 0.5 to 15 wt. % solids.

In still another aspect consistent with this invention, a fourth method can comprise (a) introducing a feed mixture containing a fluid and from 1 to 15 wt. % of a catalyst system component into a first inlet of a first hydrocyclone, wherein from 4 to 20 wt. % of the catalyst system component has a particle size of less than or equal to 20 μm, (b) discharging from the first hydrocyclone a first overflow stream containing from 0.1 to 5 wt. % solids and a first underflow stream containing from 10 to 40 wt. % solids, (c) introducing the first underflow stream into a second inlet of a second hydrocyclone, and (d) discharging from the second hydrocyclone a second overflow stream containing from 0.1 to 15 wt. % solids and a second underflow stream containing from 10 to 40 wt. % solids.

Also provided herein are modified catalyst components, and in some aspects, such compositions can have or can be characterized by i) a wet particle density in a range from 1.05 to 2.0 g/cc, ii) a BET surface area in a range from 50 to 1000 m$^2$/g, iii) a d50 average particle size in a range from 20 to 200 μm, iv) a ratio of d50/d5 in a range from 1.5 to 3.6, and v) a ratio of d95/d5 in a range from 3 to 7.5, and wherein less than or equal to 4 wt. % of the modified catalyst component has a particle size of less than or equal to 20 μm.

Further, systems for modifying a catalyst system component also are disclosed herein, and a representative system can comprise (a) a hydrocyclone configured to separate a feed mixture containing a fluid and from 1 to 15 wt. % of the catalyst system component, wherein a first amount of the catalyst system component in the feed mixture has a particle size of less than or equal to 20 μm into (1) an overflow stream and (2) an underflow stream containing from 10 to 40 wt. % of the catalyst system component, wherein a second amount of the catalyst system component in the underflow stream has a particle size of less than or equal to 20 μm, and wherein the second amount is at least 50% less than the first amount, and (b) a spray dryer configured to dry the underflow stream to form a modified catalyst component.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description and examples.

Figure 2:
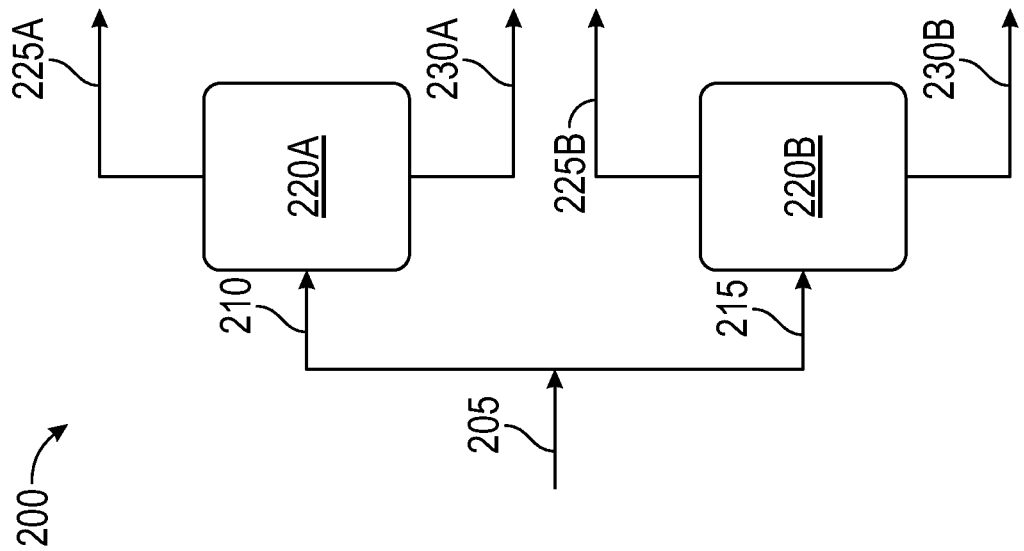
FIGS. 1-4 present schematic flow diagrams for methods of modifying a catalyst component consistent with aspects of this invention.

While the inventions disclosed herein are susceptible to various modifications and alternative forms, only a few specific aspects have been shown by way of example in the drawings and described in detail below. The figures and detailed descriptions of these specific aspects are not intended to limit the breadth or scope of the inventive concepts or the appended claims in any manner. Rather, the figures and detailed descriptions are provided to illustrate the inventive concepts to a person of ordinary skill in the art and to enable such person to make and use the inventive concepts.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the catalysts, compositions, systems, or methods described herein are contemplated with or without explicit description of the particular combination. Additionally, unless explicitly recited otherwise, any aspect or feature disclosed herein can be combined to describe inventive catalysts, compositions, systems, or methods consistent with the present disclosure.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). Non-limiting examples of hydrocarbons include alkanes (linear, branched, and cyclic), alkenes (olefins), and aromatics, among other compounds. Herein, cyclics and aromatics encompass fused ring compounds such as bicyclics and polycyclics.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The terms "contacting" and "combining" are used herein to describe systems, compositions, and methods in which the materials or components are contacted or combined together in any order, in any manner, and for any length of time, unless otherwise specified. For example, the materials or components can be blended, mixed, slurried, dissolved, reacted, treated, impregnated, compounded, or otherwise contacted or combined in some other manner or by any suitable method or technique.

"BET surface area" as used herein means the surface area as determined by the nitrogen adsorption Brunauer, Emmett, and Teller (BET) method according to ASTM D1993-91, and as described, for example, in Brunauer, S., Emmett, P. H., and Teller, E., "Adsorption of gases in multimolecular layers," J. Am. Chem. Soc., 60, 3, pp. 309-319.

In this disclosure, while compositions/components, systems, and methods are described in terms of "comprising" various features, components, or steps, the compositions/components, systems, and methods also can "consist essentially of" or "consist of" the various features, components, or steps, unless stated otherwise.

The terms "a," "an," and "the" are intended to include plural alternatives, e.g., at least one. For instance, the disclosure of "a fluid," "a catalyst system component," etc., is meant to encompass one, or mixtures or combinations of more than one, fluid, catalyst system component, etc., unless otherwise specified.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that the catalyst system component can have a wet particle density in certain ranges. By a disclosure that the wet particle density can be in a range from 1.05 to 2.0 g/cc, the intent is to recite that the wet particle density can be any density in the range and, for example, can include any range or combination of ranges from 1.05 to 2.0 g/cc, such as from 1.05 to 1.5 g/cc, from 1.2 to 2.0 g/cc, from 1.2 to 1.8 g/cc, from 1.2 to 1.6 g/cc, from 1.3 to 1.9 g/cc, from 1.3 to 1.7 g/cc, or from 1.3 to 1.5 g/cc, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

The particle size distributions are characterized by the measurements of dX, such as d5, d10, d50, d90, d95, etc., where the number "X" is the corresponding particle size when the cumulative percentage of particles reaches X %. Thus, d50 is the size when the cumulative percentage of particles is 50%. The measurement d50 is also called the median particle size. For example, a sample with d50=40 μm means that 50% of the particles are larger than 40 μm and 50% of the sample particles are smaller than 40 μm. Similarly, a sample with d5=3 μm means that 95% of the particles are larger than 3 μm and 5% of the particles are smaller than 3 μm. The span of the distribution is defined as (d90−d10)/d50.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

The present invention is generally directed to the use of one or more hydrocyclones to modify the particle size distribution of a catalyst system component. The catalyst system component can be used with other components to form a catalyst system (e.g., metallocene, Ziegler-Natta, or chromium catalyst system) for polymerizing olefins such as ethylene in various reactor types, including fluidized bed gas phase and loop slurry reactors.

In loop slurry processes for the production of ethylene-based polymers, the benefits of smaller catalyst particle sizes generally include lower gels, more surface area which increases the potential for collisions and mass transfer, lower saltation velocities, greater potential reactor mass solids, longer reactor residence times, higher activities, and more efficient purge capability. However, there are significant drawbacks to the use of ultra-small particle sizes (fines), in particular, difficulties with activation and transfer of the solid oxide (or activator, or catalyst) into the reactor, issues of downstream powder/fluff transfer (since smaller catalyst particles generally make smaller polymer particles), and higher slurry viscosity due the greater surface area of the fine particles. These disadvantages are especially evident when the catalyst or catalyst component contains a significant amount of fines that are 20 µm (or 10 µm) in diameter or smaller.

An objective of this invention, therefore, is to modify the particle size distribution of a catalyst system component, such that only a small amount of fines remain in the modified catalyst component after hydrocyclone processing. A further objective, if needed, of the hydrocyclone processing can be to minimize the amount of very large particles of the catalyst system component, since very large particles also can be problematic.

Moreover, it is also believed that the particle size distribution of catalyst system components also can significantly impact polymer properties, such as polymer molecular weight distribution, density, and rheological properties. For instance, broader particle size distributions can result in greater polymer heterogeneity. By controlling the particle size distribution of the catalyst system components used in the catalyst composition, more consistent polymer particle sizes (in powder or fluff form) can be produced, thereby resulting in more homogeneous ethylene polymers with improved polymer properties, while also minimizing gels.

Herein, very small particles of the catalyst system component, or fines, are removed using a hydrocyclone. However, unlike a crude modification of the overall particle size distribution, the methods of this invention effectively truncate the particle size distribution, drastically reducing the amount of fine particles and resulting a surprising increase in the d5 particle size after hydrocyclone processing, and in particular, when using water as the particle carrier. Moreover, and unexpectedly, these benefits were achieved when using highly porous catalyst system components, which due to their porosity, have greater buoyancy than their skeletal density might suggest, and have wet particle density values (inclusive of the pore volume) which are very close to the density of water.

Methods for Modifying Catalyst System Components

Disclosed herein are various methods for modifying catalyst system components using one or more hydrocyclones. A first method can comprise (i) introducing a feed mixture containing a fluid and from 1 to 15 wt. % of a catalyst system component into an inlet of a hydrocyclone, wherein from 4 to 20 wt. % of the catalyst system component has a particle size of less than or equal to 20 µm, (ii) discharging from the hydrocyclone an overflow stream containing from 0.1 to 5 wt. % solids and an underflow stream containing from 10 to 40 wt. % solids, and (iii) spray drying the underflow stream to form a modified catalyst component. A second method can comprise (I) introducing a feed mixture containing a fluid and from 1 to 15 wt. % of a catalyst system component having a wet particle density of from 1.05 to 2.0 g/cc into an inlet of a hydrocyclone at a linear velocity of from 2 to 20 ft/sec (0.6 to 6.1 m/sec), wherein from 4 to 20 wt. % of the catalyst system component has a particle size of less than or equal to 20 µm, and (II) discharging from the hydrocyclone an overflow stream containing from 0.1 to 5 wt. % solids and an underflow stream containing from 10 to 40 wt. % solids. The wet particle density is the particle density in water and is determined by the following equation: wet particle density=(1+PV)/(PV+1/skeletal density), where PV is the pore volume of the catalyst system component. In some aspects, the second method can further comprise a step of spray drying the underflow stream to form a modified catalyst component. Additionally or alternatively, the first method and the second method can further comprise a step of spray drying the overflow stream, if desired.

Figure 1:
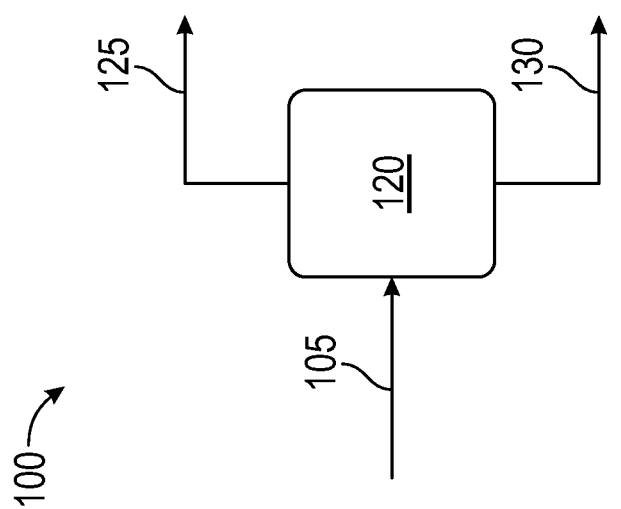

Referring now to FIG. 1, which illustrates in part the first and second methods disclosed herein. In the method 100 of FIG. 1, feed mixture 105 is introduced into an inlet of hydrocyclone 120, and discharged from hydrocyclone 120 are overflow stream 125 and underflow stream 130. Although not shown in FIG. 1, underflow stream 130 can be conveyed to a spray dryer to form the (dried) modified catalyst component. Optionally, underflow stream 130 can be conveyed to a tank or other vessel, combined with one or more other materials, and then spray dried. FIG. 2 is a parallel variation of FIG. 1 in which the feed mixture is split and fed into the respective inlets of two hydrocyclones operating in parallel. In the method 200 of FIG. 2, feed mixture 205 is split into first feed stream 210 and second feed stream 215, which are introduced into the respective inlets of first hydrocyclone 220A and second hydrocyclone 220B. Discharged from first hydrocyclone 220A are first overflow stream 225A and first underflow stream 230A, and likewise, discharged from second hydrocyclone 220B are second overflow stream 225B and second underflow stream 230B. Although two hydrocyclones are operated in parallel in FIG. 2, it is contemplated that three or four, or more, hydrocyclones can similarly be configured in parallel. First underflow stream 230A and second underflow stream 230B can be conveyed, together or separately, to a spray dryer to form the (dried) modified catalyst component, if desired. Also optionally, first underflow stream 230A and/or second underflow stream 230B can be conveyed to a tank or other vessel, combined with one or more other materials, and then spray dried.

A third method can comprise (a) introducing a feed mixture containing a fluid and from 1 to 15 wt. % of a catalyst system component into a first inlet of a first hydrocyclone, wherein from 4 to 20 wt. % of the catalyst system component has a particle size of less than or equal to 20 µm, (b) discharging from the first hydrocyclone a first overflow stream containing from 0.1 to 5 wt. % solids and a first underflow stream containing from 10 to 40 wt. % solids, (c) introducing the first overflow stream into a second inlet of a second hydrocyclone, and (d) discharging from the second hydrocyclone a second overflow stream containing from 0.05 to 2.5 wt. % solids and a second underflow stream containing from 0.5 to 15 wt. % solids. Optionally, the third method can further comprise a step of spray drying the first underflow stream, or the second underflow stream, or both the first underflow stream and the second underflow stream, to form a modified catalyst component. Additionally or alternatively, the third method can further comprise a step of spray drying the second overflow stream, if desired.

Figure 3:
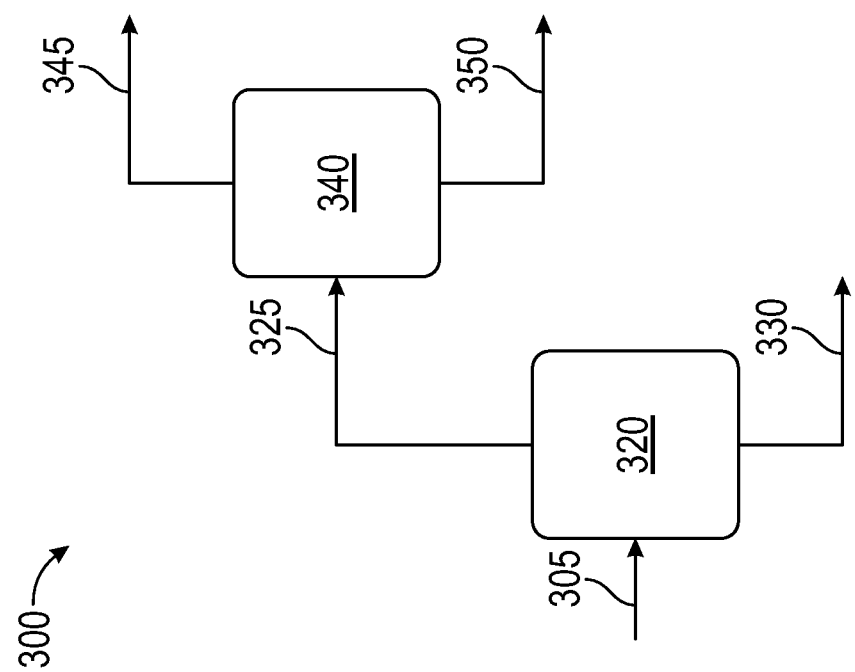

A schematic representation of the third method 300 is illustrated in FIG. 3, in which feed mixture 305 is introduced into an inlet of first hydrocyclone 320, and discharged from first hydrocyclone 320 are first overflow stream 325 and first underflow stream 330. First overflow stream 325 is introduced into an inlet of second hydrocyclone 340, and discharged from second hydrocyclone 340 are second overflow stream 345 and second underflow stream 350. Optionally, first underflow stream 330 and/or second underflow stream 350 in FIG. 3 can be spray dried to form the (dried) modified catalyst component, or first underflow stream 330 and/or second underflow stream 350 can be combined with one or more other materials and then spray dried.

A fourth method can comprise (a) introducing a feed mixture containing a fluid and from 1 to 15 wt. % of a catalyst system component into a first inlet of a first hydrocyclone, wherein from 4 to 20 wt. % of the catalyst system component has a particle size of less than or equal to 20 µm, (b) discharging from the first hydrocyclone a first overflow stream containing from 0.1 to 5 wt. % solids and a first underflow stream containing from 10 to 40 wt. % solids, (c) introducing the first underflow stream into a second inlet of a second hydrocyclone, and (d) discharging from the second hydrocyclone a second overflow stream containing from 0.1 to 15 wt. % solids and a second underflow stream containing from 10 to 40 wt. % solids. Optionally, the fourth method can further comprise a step of spray drying the second overflow stream to form a modified catalyst component, and additionally or alternatively, the fourth method can further comprise a step of spray drying the first overflow stream and/or the second underflow stream, if desired.

Also optionally, the fourth method can further comprise a step of diluting the first underflow stream prior to step (c) and the second inlet of the second hydrocyclone. For instance, dilutions to a solid content in the 1 to 15 wt. % range prior to entering the second inlet of the second hydrocyclone are contemplated, and other suitable non-limiting ranges include from 2 to 12 wt. %, from 3 to 12 wt. %, or from 4 to 8 wt. %.

Figure 4:
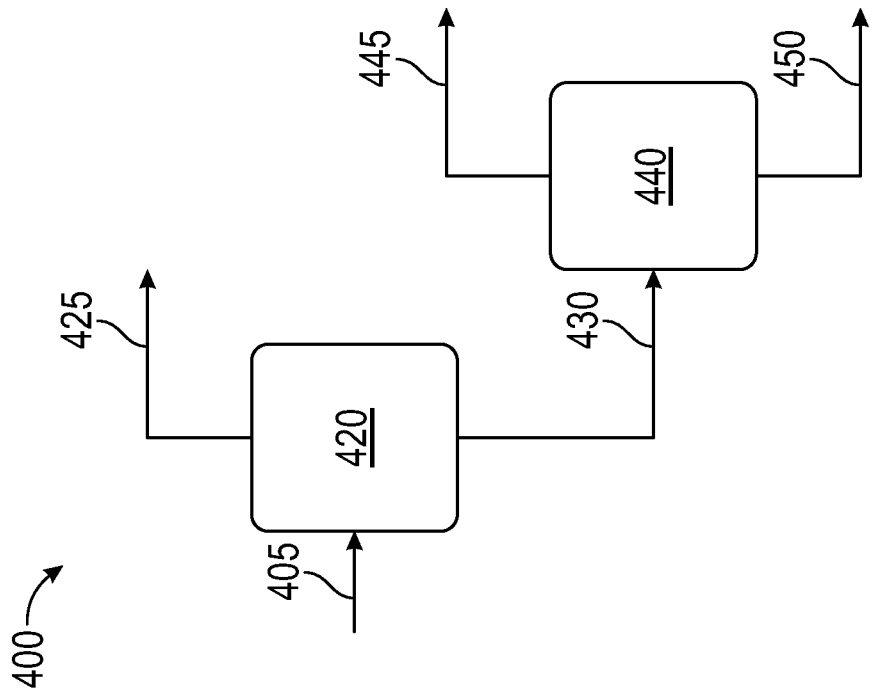

A schematic representation of the fourth method 400 is illustrated in FIG. 4, in which feed mixture 405 is introduced into an inlet of first hydrocyclone 420, and discharged from first hydrocyclone 420 are first overflow stream 425 and first underflow stream 430. First underflow stream 430 is introduced into an inlet of second hydrocyclone 440, and discharged from second hydrocyclone 440 are second overflow stream 445 and second underflow stream 450. Optionally, second overflow stream 445 in FIG. 4 can be spray dried to form the (dried) modified catalyst component or second overflow stream 445 can be combined with one or more other materials and then spray dried, and also optionally, first underflow stream 430 can be diluted prior entering second hydrocyclone 440.

Generally, the features of the first method, the second method, the third method, and the fourth method (e.g., the fluid, the amount of the catalyst system component in the fluid, the characteristics of the catalyst system component, the characteristics of the overflow stream and the underflow stream, and the conditions under which the hydrocyclone is operated, among others) are independently described herein and these features can be combined in any combination to further describe the disclosed methods. Moreover, additional process steps can be performed before, during, and/or after any of the steps in any of the methods disclosed herein, and can be utilized without limitation and in any combination to further describe these methods, unless stated otherwise. Further, any modified catalyst components produced in accordance with the disclosed methods are within the scope of this disclosure and are encompassed herein.

In each of the first method, the second method, the third method, and the fourth method, an optional step of concentrating solids—increasing the wt. % solids—prior to any spray drying step can be performed. Moreover, any of the first method, the second method, the third method, and the fourth method can be performed with an additional hydrocyclone (or additional hydrocyclones) in series. Additionally or alternatively, any of the first method, the second method, the third method, and the fourth method can be performed with an additional hydrocyclone (or additional hydrocyclones) in parallel—for instance, the feed mixture can be split and fed into the respective inlets of two hydrocyclones operating in parallel (as shown representatively in FIG. 2).

In each of the first method, the second method, the third method, and the fourth method, a step of spray drying can be performed. Other suitable drying options can be used instead of spray drying, and the drying step can encompass a wide range of drying times, drying temperatures, and drying pressures (including sub-atmospheric pressures). Thus, the disclosure of a step of spray drying in any method or any system disclosed herein, in an aspect of this invention, can alternatively include any suitable drying technique, such as tray drying, rotary drying, fluidized bed drying, and the like, although not limited thereto. Likewise, the disclosure of the use of a spray dryer in any method or any system disclosed herein, in an aspect of this invention, can alternatively include any suitable drying apparatus, such as a tray dryer, a rotary dryer, a fluidized bed dryer, and the like, although not limited thereto.

Referring now to the first step in the first method, the second method, the third method, and the fourth method, a feed mixture (which can be a slurry) containing a fluid and from 1 to 15 wt. % of a catalyst system component is introduced into an inlet of a hydrocyclone (or into a first inlet of a first hydrocyclone). Any suitable fluids and catalyst system components can be present in the feed mixture. Representative catalyst system components are discussed further hereinbelow. As to the fluid component of the feed mixture, in one aspect, the fluid can comprise (or consist essentially of, or consist of) water. For instance, water can be at least 80 wt. % of the fluid, such as at least 85 wt. %, at least 90 wt. %, at least 95 wt. %, at least 98 wt. %, or at least 99 wt. %, of the fluid. Optionally, when water is used as the fluid, any suitable surfactant can be added to the water at any amount from greater than zero up to 5 wt. %, up to 4 wt. %, up to 3 wt. %, up to 2 wt. %, or up to 1 wt. %. While not wishing to be bound by theory, the addition of a minor amount of a surfactant may reduce surface tension and impact the separation or distribution of particles in the hydrocyclone into the respective underflow and overflow streams.

In another aspect, the fluid can comprise an organic oxygen-containing compound, non-limiting examples of which can include, an alcohol compound, a ketone compound, an aldehyde compound, or an ether compound, as well as any combination thereof. In yet another aspect, the fluid can comprise a mixture of water and the organic oxygen-containing compound; for instance, the fluid can comprise a mixture of water and an alcohol compound. In still another aspect, the fluid can comprise a hydrocarbon compound, such as an alkane compound or an aromatic compound. Illustrative examples of alkane and aromatic hydrocarbons that can be utilized as the fluid either singly or in combination can include pentane, hexane, heptane, octane, nonane, decane, benzene, toluene, ethylbenzene, xylene, and the like.

The solids contents of the feed mixture typically ranges from 1 to 15 wt. %, thus the feed mixture contains the fluid (e.g., water) and from 1 to 15 wt. % of the catalyst system component (based on the total weight of the feed mixture). More often, the feed mixture contains the fluid and from 2 to 14 wt. %, from 2 to 12 wt. %, from 3 to 15 wt. %, or from 3 to 12 wt. % solids (catalyst system component) in some aspects, and from 4 to 12 wt. %, from 4 to 10 wt. %, or from 4 to 8 wt. % solids (catalyst system component) in other aspects.

The catalyst system component in the feed mixture can be characterized by various features based on its particle size distribution (PSD). For instance, the amount of the catalyst system component in the feed mixture having a particle size of less than or equal to 20 μm, in one aspect, can range from 4 to 20 wt. %; alternatively, from 5 to 16 wt. %; alternatively, from 6 to 18 wt. %; alternatively, from 6 to 12 wt. %; alternatively, from 7 to 20 wt. %; alternatively, from 7 to 15 wt. %; or alternatively, from 8 to 14 wt. %. In another aspect, the amount of the catalyst system component in the feed mixture having a particle size of less than or equal to 15 μm can range from 4 to 20 wt. %; alternatively, from 5 to 16 wt. %; alternatively, from 6 to 18 wt. %; alternatively, from 6 to 12 wt. %; alternatively, from 7 to 20 wt. %; alternatively, from 7 to 15 wt. %; or alternatively, from 8 to 14 wt. %. In yet another aspect, the amount of the catalyst system component in the feed mixture having a particle size of less than or equal to 10 μm can range from 4 to 20 wt. %; alternatively, from 5 to 16 wt. %; alternatively, from 6 to 18 wt. %; alternatively, from 6 to 12 wt. %; alternatively, from 7 to 20 wt. %; alternatively, from 7 to 15 wt. %; or alternatively, from 8 to 14 wt. %. In still another aspect, the amount of the catalyst system component in the feed mixture having a particle size of less than or equal to 5 μm can range from 4 to 20 wt. %; alternatively, from 5 to 16 wt. %; alternatively, from 6 to 18 wt. %; alternatively, from 6 to 12 wt. %; alternatively, from 7 to 20 wt. %; alternatively, from 7 to 15 wt. %; or alternatively, from 8 to 14 wt. %.

While not limited thereto, the catalyst system component in the feed mixture often can have a ratio of d50/d5 from 4 to 8, such as from 4 to 7, from 4 to 6.5, from 4 to 6, or from 4.5 to 6.5, and the like. Additionally, or alternatively, the catalyst system component in the feed mixture often can have a ratio of d95/d5 from 8 to 20, such as from 8 to 18, from 8 to 16, from 8.5 to 18, or from 8.5 to 16, and the like, although not limited thereto.

Generally, the catalyst system component has a relatively low wet particle density, due to the high porosity of the catalyst system component, and thus the wet particle density can be significantly different from the skeletal density of the catalyst system component (with no porosity). As disclosed herein, the wet particle density is the particle density in water and is determined by the following equation: wet particle density=$(1+PV)/(PV+1/\text{skeletal density})$, where PV is the pore volume of the catalyst system component. The wet particle density of the catalyst system component can range from 1.05 to 2.0 g/cc in one aspect, from 1.05 to 1.5 g/cc or from 1.2 to 2.0 g/cc in another aspect, from 1.2 to 1.8 g/cc or from 1.2 to 1.6 g/cc in another aspect, from 1.3 to 1.9 g/cc or from 1.3 to 1.7 g/cc in yet another aspect, and from 1.3 to 1.5 g/cc in still another aspect.

The catalyst system component can have any suitable pore volume and BET surface area features, as a skilled artisan would consider useful for catalyst system components typically employed in olefin-based polymerization processes. Pore volumes (total) of the catalyst system component can range from 0.3 to 5 mL/g; therefore, illustrative non-limiting ranges for the pore volume include from 0.5 to 5 mL/g, from 0.3 to 3 mL/g, from 0.5 to 2 mL/g, from 0.5 to 1.8 mL/g, or from 0.7 to 1.6 mL/g, and like. BET surface areas of the catalyst system component can range from 50 to 1000 m$^2$/g; therefore, illustrative non-limiting ranges for the BET surface area include from 100 to 700 m$^2$/g, from 100 to 400 m$^2$/g, from 150 to 500 m$^2$/g, or from 200 to 450 m$^2$/g, and the like.

Referring now to the first step in the first method and the second method, the feed mixture containing the fluid (e.g., water) and the catalyst system component can be introduced into the inlet of a hydrocyclone at any suitable linear velocity. While not limited thereto, this linear velocity can range from 2 to 20 ft/sec (0.6 to 6.1 m/sec). More often, the linear velocity of the feed mixture entering the inlet of the hydrocyclone ranges from 5 to 20 ft/sec (1.5 to 6.1 m/sec), such as from 5 to 15 ft/sec (1.5 to 4.6 m/sec), from 7 to 14 ft/sec (2.1 to 4.3 m/sec), or from 8 to 12 ft/sec (2.4 to 3.7 m/sec), and the like. The range of 2 to 20 ft/sec (0.6 to 6.1 m/sec) and the ranges falling within in this range are also suitable linear velocities for the feed mixture entering the first inlet of the first hydrocyclone in the third method and the fourth method; for the first overflow stream entering the second inlet of the second hydrocyclone in the third method; and for the first underflow stream entering the second inlet of the second hydrocyclone in the fourth method.

In these methods, the temperature used during hydrocyclone processing is not particularly limited, other than a temperature at which the fluid remains a liquid throughout the method. In certain aspects, the temperature of the feed mixture entering the inlet of the hydrocyclone (or the temperature of the feed mixture entering the first inlet of the first hydrocyclone, or the temperature of the first overflow stream entering the second inlet of the second hydrocyclone, or the temperature of the first underflow stream entering the second inlet of the second hydrocyclone) can fall within a range from 10° C. to 80° C., such as from 15° C. to 60° C., from 15° C. to 40° C., or from 20° C. to 45° C., and the like. These temperature ranges also are meant to encompass circumstances where the method is performed at a series of different temperatures, instead of at a single fixed temperature, falling within the respective temperature ranges, wherein at least one temperature is within the recited ranges.

In the second step of the first method and the second method, an overflow stream containing from 0.1 to 5 wt. % solids and an underflow stream containing from 10 to 40 wt. % solids are discharged from the hydrocyclone, while in the second step of the third method and the fourth method, a first overflow stream containing from 0.1 to 5 wt. % solids and a first underflow stream containing from 10 to 40 wt. % solids are discharged from the first hydrocyclone. In some aspects, the overflow stream (or the first overflow stream) can contain from 0.1 to 3 wt. % solids or from 0.3 to 2 wt. % solids, while in other aspects, the overflow stream (or the first overflow stream) can contain from 0.5 to 4 wt. % solids or from 0.5 to 2 wt. % solids. Likewise, in some aspects, the underflow stream (or the first underflow stream) can contain from 10 to 30 wt. % solids or from 10 to 20 wt. % solids, while in other aspects, the underflow stream (or the first underflow stream) can contain from 15 to 40 wt. % solids or from 15 to 30 wt. % solids.

In addition to the impact on the solids content of the streams exiting the hydrocyclone (or exiting the first hydrocyclone), the particle size distributions of the exiting streams have been modified significantly from that of the catalyst system component in the feed mixture entering the hydrocyclone. For instance, the amount of the catalyst system component in the overflow stream (or the first overflow stream) having a particle size of less than or equal to 20 μm, in one aspect, can range from 30 to 95 wt. %; alternatively, from 30 to 88 wt. %; alternatively, from 35 to 95 wt. %; alternatively, from 35 to 90 wt. %; alternatively, from 40 to 95 wt. %; or alternatively, from 40 to 85 wt. %. In another aspect, the amount of the catalyst system component in the overflow stream (or the first overflow stream) having a particle size of less than or equal to 15 μm can range from 30 to 95 wt. %; alternatively, from 30 to 88 wt. %; alternatively, from 35 to 95 wt. %; alternatively, from 35 to 90 wt. %; alternatively, from 40 to 95 wt. %; or alternatively, from 40 to 85 wt. %. In yet another aspect, the amount of the catalyst system component in the overflow stream (or the first overflow stream) having a particle size of less than or equal to 10 μm can range from 30 to 95 wt. %; alternatively, from 30 to 88 wt. %; alternatively, from 35 to 95 wt. %; alternatively, from 35 to 90 wt. %; alternatively, from 40 to 95 wt. %; or alternatively, from 40 to 85 wt. %. In still another aspect, the amount of the catalyst system component in the overflow stream (or the first overflow stream) having a particle size of less than or equal to 5 μm can range from 30 to 95 wt. %; alternatively, from 30 to 88 wt. %; alternatively, from 35 to 95 wt. %; alternatively, from 35 to 90 wt. %; alternatively, from 40 to 95 wt. %; or alternatively, from 40 to 85 wt. %.

While not limited thereto, the catalyst system component in the overflow stream (or the first overflow stream) can be characterized by a d50 average particle size that ranges from 3 to 35 μm, such as from 3 to 18 μm, from 3 to 15 μm, from 3 to 12 μm, from 4 to 30 μm, from 4 to 15 μm, from 5 to 15 μm, or from 6 to 12 μm, and the like.

Referring now to the underflow stream, the amount of the catalyst system component in the underflow stream (or the first underflow stream) having a particle size of less than or equal to 20 μm, in one aspect, can be less than or equal to 4 wt. %; alternatively, less than or equal to 3 wt. %; alternatively, less than or equal to 2.5 wt. %; alternatively, less than or equal to 2 wt. %; or alternatively, less than or equal to 1.5 wt. %. In another aspect, the amount of the catalyst system component in the underflow stream (or the first underflow stream) having a particle size of less than or equal to 15 μm can be less than or equal to 4 wt. %; alternatively, less than or equal to 3 wt. %; alternatively, less than or equal to 2.5 wt. %; alternatively, less than or equal to 2 wt. %; or alternatively, less than or equal to 1.5 wt. %. In yet another aspect, the amount of the catalyst system component in the underflow stream (or the first underflow stream) having a particle size of less than or equal to 10 μm can be less than or equal to 4 wt. %; alternatively, less than or equal to 3 wt. %; alternatively, less than or equal to 2.5 wt. %; alternatively, less than or equal to 2 wt. %; or alternatively, less than or equal to 1.5 wt. %. In still another aspect, the amount of the catalyst system component in the underflow stream (or the first underflow stream) having a particle size of less than or equal to 5 μm can be less than or equal to 4 wt. %; alternatively, less than or equal to 3 wt. %; alternatively, less than or equal to 2.5 wt. %; alternatively, less than or equal to 2 wt. %; or alternatively, less than or equal to 1.5 wt. %. Minimum amounts can be any amount greater than zero, such as at least 0.05 wt. %, at least 0.1 wt. %, or at least 0.5 wt. %.

The catalyst system component in the underflow stream (or the first underflow stream) also can be further characterized by a ratio of d50/d5 from 1.5 to 3.6, such as from 1.5 to 3.3, from 1.8 to 3.6, from 2 to 3.5, or from 2 to 3.3, and the like. Additionally or alternatively, the catalyst system component in the underflow stream (or the first underflow stream) often can have a ratio of d95/d5 from 3 to 7.5, such as from 3 to 7, from 3.5 to 7.5, from 3.5 to 7, from 4 to 7.5, or from 4 to 7, and the like, although not limited thereto.

The d50 average particle size of the catalyst system component in the feed mixture and in the underflow stream (or the first underflow stream) are often very similar, and independently can fall within a range from 20 to 200 μm. Other suitable ranges for the d50 average particle size of the catalyst system component in the feed mixture and in the underflow stream (or the first underflow stream), independently, can include from 20 to 150 μm, from 20 to 60 μm, from 20 to 50 μm, from 25 to 140 μm, from 25 to 60 μm, from 25 to 50 μm, from 30 to 145 μm, from 30 to 45 μm, from 35 to 150 μm, from 35 to 100 μm, or from 35 to 50 μm, and the like.

Referring now to the third method, in which the first overflow stream is introduced into a second inlet of a second hydrocyclone in step (c), and in step (d), a second overflow stream containing from 0.05 to 2.5 wt. % solids and a second underflow stream containing from 0.5 to 15 wt. % solids are discharged from the second hydrocyclone. These steps can be performed in a manner similar to that of step (a) and step (b) of the third method. In some aspects, the second overflow stream can contain from 0.05 to 2 wt. % solids or from 0.05 to 1 wt. % solids, while in other aspects, the second overflow stream can contain from 0.1 to 2.5 wt. % solids or from 0.5 to 2.5 wt. % solids. Likewise, in some aspects, the second underflow stream can contain from 0.5 to 12 wt. % solids or from 0.5 to 10 wt. % solids, while in other aspects, the second underflow stream can contain from 1 to 15 wt. % solids or from 3 to 15 wt. % solids.

Referring now the fourth method, in which the first underflow stream is introduced into a second inlet of a second hydrocyclone in step (c), and in step (d), a second overflow stream containing from 0.1 to 15 wt. % solids and a second underflow stream containing from 10 to 40 wt. % solids are discharged from the second hydrocyclone. These steps can be performed in a manner similar to that of step (a) and step (b) of the fourth method. In some aspects, the second overflow stream can contain from 0.1 to 10 wt. % solids or from 0.1 to 5 wt. % solids, while in other aspects, the second overflow stream can contain from 0.5 to 15 wt. % solids or from 3 to 12 wt. % solids. Likewise, in some aspects, the second underflow stream can contain from 10 to 30 wt. % solids or from 10 to 25 wt. % solids, while in other aspects, the second underflow stream can contain from 15 to 40 wt. % solids or from 20 to 40 wt. % solids.

Consistent with aspects of this invention, the underflow stream in the first method and the second method can be spray dried, the first and/or second underflow stream in the third method can be spray dried, and the second overflow stream in the fourth method can be spray dried, resulting in the modified catalyst component. Generally, spray drying can be used to transform the respective wet stream (e.g., a slurry of solids) to a dried particulate or powder form by spraying the wet stream containing the solids into a device containing a hot drying gas (usually air), in which the residual fluid (e.g., water) evaporates from the particulate solids.

In the spray drying process, the feed stream can be sprayed into a drying chamber in the form of droplets, and contacted with a large volume of a hot gas, which directly contacts the wet solids. Typical gas inlet temperatures range from 95° C. to about 800° C., or from about 100° C. to about 500° C., but are not limited thereto. Representative outlet temperatures can range from 80° C. to 200° C. The flow of the gas relative to the flow of the solid into the spray dryer can be concurrent flow, countercurrent flow, or mixed flow. After drying, the gas stream and the dried particles of modified catalyst component are separated. If needed, fines can be removed in filter collectors or cyclones. The dried modified catalyst components can have the form of free-flowing particulate solids.

The initial feed into the spray dryer can be subjected to an atomization process, which can employ, for instance, a high-pressure nozzle, a two-fluid nozzle, or a high-speed centrifugal disk. High-pressure nozzles result in atomization by forcing the slurry of solids under high pressure through a small nozzle orifice, the size of which can depend on the desired pressure and particle size of the solids in the slurry, among other factors. Wear on the nozzle orifice and plugging can result during long-term operation; therefore, regular maintenance can be beneficial to ensure proper atomization. Two-fluid nozzles have the advantage of a relatively low operating pressure, and often can be used when the feed stream is a thick or high-solids slurry, which does not work well in high-pressure nozzle systems. The atomizing fluid can be steam or air.

High-speed centrifugal disks atomize the wet slurry by contacting the slurry with a rapidly rotating disk. Disk diameter and disk speed (e.g., 3,000 rpm and above) can be varied to produce a suitable droplet size for drying. Beneficially, disk atomization is subject to less wear and plugging than in the nozzle systems. Disk rotation can be driven by any suitable motor or technique.

Regardless of the atomization process, the spray drying process can be configured to maintain a generally spherical nature of the catalyst component. The average particle size of the solid material can be maintained in many instances, and generally, the average particle size depends upon the atomization process, the solids content of the feed stream, feed stream viscosity, and feed rate, among other factors. Likewise, bulk density of the dried modified catalyst component can be controlled based on operating conditions of the spray dryer, such as droplet size, inlet gas temperature, and air turbulence, among other factors.

Mixing of the gas stream (e.g., air) and the droplet in the drying chamber can be accomplished, for example, using concurrent flow of gas and solids (e.g., horizontal or vertical spray dryers), or countercurrent flow of gas and solids. In the latter case, upward air flow can carry fines to the top of the chamber for easy removal. Mixed flow spray dryers combine countercurrent and concurrent drying, with complex flow patterns and high turbulence for efficient heat and mass transfer.

A benefit to spray drying can be the short contact time of the catalyst component to elevated temperatures in the drying chamber. Thus, in addition to average particle size, the spray drying process can be configured to produce dried particles that have surface areas and pore volumes that are comparable to the starting material (i.e., prior to spray drying).

Optionally, feedback control can be incorporated into these methods. For instance, the first method, the second method, the third method, and the fourth method can further comprise the steps of a) determining a particle size feature of the catalyst system component in the feed mixture, and b) adjusting a hydrocyclone processing parameter based on the particle size feature. The particle size feature can be determined using an in-process particle size analysis technique and/or using an off-line particle size analysis technique. The particle size feature being monitored is not particularly limited, and representative examples of particle size features include the d50 average particle size, the ratio of d50/d5, the ratio of d95/d5, the amount of the catalyst system component having a particle size of less than or equal to 20 μm, the amount of the catalyst system component having a particle size of less than or equal to 15 μm, the amount of the catalyst system component having a particle size of less than or equal to 10 μm, the amount of the catalyst system component having a particle size of less than or equal to 5 μm, and the like, as well as any combination thereof.

Likewise, the hydrocyclone processing parameter that can be adjusted based on the particle size feature is not particularly limited, and representative examples include the linear velocity of the respective feed mixture or stream, the temperature of the respective feed mixture or stream, the amount of the catalyst system component in the respective feed mixture or stream (wt. % solids), and the like, as well as any combination thereof.

In some aspects, another feedback control can be incorporated into these methods, and in these aspects, the methods can further comprise the steps of A) determining a particle size feature of the catalyst system component in the underflow stream (or in the first underflow stream, or in the second underflow stream) and/or in the overflow stream (or in the first overflow stream, or in the second overflow stream), and B) adjusting a hydrocyclone processing parameter based on the particle size feature. As above, the particle size feature being monitored, either singly or in any combination, can be the d50 average particle size, the ratio of d50/d5, the ratio of d95/d5, and/or the amount of the catalyst system component having a particle size of less than or equal to 20 μm (or less than or equal to 15 μm, or less than or equal to 10 μm, or less than or equal to 5 μm). Likewise, the hydrocyclone processing parameter that can be adjusted based on the particle size feature, either singly or in any combination, can be the linear velocity of the respective feed mixture or stream, the temperature of the respective feed mixture or stream, and/or the amount of the catalyst system component in the respective feed mixture or stream (wt. % solids).

Herein, the first method, the second method, the third method, and the fourth method can be characterized by a separation efficiency, which is defined as the amount of the catalyst system component having a particle size of less than or equal to 20 μm (or in a related aspect, less than or equal to 10 μm) in the feed mixture minus the amount of the catalyst system component having a particle size of less than or equal to 20 µm (or in a related aspect, less than or equal to 10 µm) in the underflow stream, then that difference divided by the amount of the catalyst system component having the particle size of less than or equal to 20 µm (or in a related aspect, less than or equal to 10 µm) in the feed mixture. As an example, if 8 lb (on a 100 lb basis) in the feed mixture has a particle size less than or equal to 20 µm (or in a related aspect, less than or equal to 10 µm), and 1 lb in the underflow stream has a particle size less than or equal to 20 µm (or in a related aspect, less than or equal to 10 µm), then the separation efficiency equals (8-1)/8, which converts to 88%.

Generally, a separation efficiency of the first method, the second method, the third method, and the fourth method—independently—can fall within a range from 80 to 98%, such as from 80 to 95%, from 80 to 92%, from 82 to 95%, from 82 to 92%, from 85 to 98%, from 85 to 95%, or from 85 to 92%, and the like.

Catalyst System Components

Generally, any suitable catalyst system component can be used in the first method, the second method, the third method, and the fourth method. In one aspect, the catalyst system component can comprise a solid oxide, which can contain oxygen and one or more elements selected from Group 2, 3, 4, 5, 6, 7, 8, 9, 10, 11, 12, 13, 14, or 15 of the periodic table, or comprise oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the solid oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr. Illustrative examples of solid oxide materials or compounds that can be used as the catalyst system component can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof.

The solid oxide can encompass oxide materials such as silica, alumina, or titania, "mixed oxide" compounds thereof such as silica-titania, and combinations or mixtures of more than one solid oxide material. Mixed oxides such as silica-titania can be single or multiple chemical phases with more than one metal combined with oxygen to form the solid oxide. Examples of mixed oxides that can be used as solid oxide include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. In some aspects, the catalyst system component can comprise silica, silica-alumina, silica-coated alumina, silica-titania, silica-titania-magnesia, silica-zirconia, silica-magnesia, silica-boria, aluminophosphate-silica, and the like, or any combination thereof. Silica-coated aluminas are encompassed herein; such oxide materials are described in, for example, U.S. Pat. Nos. 7,884,163 and 9,023,959.

The percentage of each oxide in a mixed oxide can vary depending upon the respective oxide materials. As an example, a silica-alumina (or silica-coated alumina) typically has an alumina content from 5 wt. % to 95 wt. %. According to one aspect, the alumina content of the silica-alumina (or silica-coated alumina) can be from 5 wt. % alumina 50 wt. % alumina, or from 8 wt. % to 30 wt. % alumina. In another aspect, high alumina content silica-aluminas (or silica-coated aluminas) can be employed, in which the alumina content of these materials typically ranges from 60 wt. % alumina to 90 wt. % alumina, or from 65 wt. % alumina to 80 wt. % alumina.

In one aspect, the solid oxide can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof; alternatively, silica, silica-alumina, silica-coated alumina, silica-titania, silica-titania-magnesia, silica-zirconia, silica-magnesia, silica-boria, aluminophosphate-silica, alumina, alumina borate, or any combination thereof; alternatively, silica; alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, thoria, stania, zirconia, magnesia, boria, zinc oxide, a mixed oxide thereof, or any mixture thereof. In yet another aspect, the solid oxide can comprise silica, alumina, titania, or a combination thereof; alternatively, silica; alternatively, alumina; alternatively, titania; alternatively, zirconia; alternatively, magnesia; alternatively, boria; or alternatively, zinc oxide. In still another aspect, the solid oxide can comprise silica, alumina, silica-alumina, silica-coated alumina, aluminum phosphate, aluminophosphate, heteropolytungstate, titania, zirconia, magnesia, boria, zinc oxide, silica-titania, silica-yttria, silica-zirconia, alumina-titania, alumina-zirconia, zinc-aluminate, alumina-boria, silica-boria, aluminophosphate-silica, titania-zirconia, and the like, or any combination thereof.

Consistent with certain aspects of this invention, the catalyst system component can comprise a chemically-treated solid oxide, and where the chemically-treated solid oxide comprises a solid oxide (any solid oxide disclosed herein) treated with an electron-withdrawing anion (any electron withdrawing anion disclosed herein). The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, and the like, including mixtures and combinations thereof. In addition, other ionic or non-ionic compounds that serve as sources for these electron-withdrawing anions also can be employed.

It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluororoborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The chemically-treated solid oxide generally can contain from 1 wt. % to 30 wt. % of the electron-withdrawing anion, based on the weight of the chemically-treated solid oxide. In particular aspects provided herein, the chemically-treated solid oxide can contain from 1 to 20 wt. %, from 2 wt. % to 20 wt. %, from 3 wt. % to 20 wt. %, from 2 wt. % to 15 wt. %, from 1 wt. % to 10 wt. %, from 2 wt. % to 10 wt. %, from 3 wt. % to 10 wt. %, of the electron-withdrawing anion, based on the total weight of the chemically-treated solid oxide.

In an aspect, the chemically-treated solid oxide can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof.

In another aspect, the chemically-treated solid oxide employed as the catalyst system component in the methods described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. Additional information on chemically-treated solid oxide can be found in, for instance, U.S. Pat. Nos. 7,294,599, 7,601,665, 7,884,163, 8,309,485, 8,623,973, and 8,703,886.

The catalyst system component, in a particular aspect, can comprise a chemically-treated solid oxide, such as fluorided silica-coated alumina or sulfated alumina, which is introduced at 1 to 15 wt. % of feed mixture containing the fluid (e.g., water) and the catalyst system component into the inlet of the hydrocyclone; the underflow stream containing from 10 to 40 wt. % solids is discharged from the hydrocyclone and then spray dried to form a modified chemically-treated solid oxide.

The catalyst system component, in another particular aspect, can comprise a solid oxide, such as silica-coated alumina or alumina, which is introduced at 1 to 15 wt. % of feed mixture containing the fluid (e.g., water) and the catalyst system component into the inlet of the hydrocyclone; the underflow stream containing from 10 to 40 wt. % solids is discharged from the hydrocyclone and then spray dried to form a modified solid oxide. Then, this modified solid oxide is chemically-treated (e.g., fluorided or sulfated) to form a modified chemically-treated solid oxide. It may be advantageous to chemically-treat the solid oxide after hydrocyclone processing, if the anion chemical treatment on the chemically-treated solid oxide is soluble in the fluid (e.g., water), which might lead to a reduction in the amount (wt. %) of chemical treatment due to the hydrocyclone processing.

In yet another particular aspect, the catalyst system component (or modified catalyst component) can comprise a fluorided silica-coated alumina, which can contain from 1 to 20 wt. % F (or from 2 wt. % to 10 wt. % F), from 0.5 to 10 wt. % Zn (or from 1 to 5 wt. % Zn), and from 0.2 to 2 wt. % B (or from 0.2 to 1.5 wt. % B).

Consistent with other aspects of this invention, the catalyst system component can comprise a zeolite. Any suitable zeolite can be used, for instance, large pore and medium pore zeolites. Large pore zeolites often have average pore diameters in a range of from about 7 Å to about 12 Å, and non-limiting examples of large pore zeolites include L-zeolite, Y-zeolite, mordenite, omega zeolite, beta zeolite, and the like. Medium pore zeolites often have average pore diameters in a range of from about 5 Å to about 7 Å. Combinations of zeolitic supports can be used.

Additional representative examples of zeolites that can be used include, for instance, a ZSM-5 zeolite, a ZSM-11 zeolite, an EU-1 zeolite, a ZSM-23 zeolite, a ZSM-57 zeolite, an ALPO4-11 zeolite, an ALPO4-41 zeolite, a Ferrierite framework type zeolite, and the like, or any combination thereof.

In the methods disclosed herein, the zeolite can be bound with a support matrix (or binder), non-limiting examples of which can include silica, alumina, magnesia, boria, titania, zirconia, various clays, and the like, including mixed oxides thereof, as well as mixtures thereof. For example, the catalyst system component can comprise a binder comprising alumina, silica, a mixed oxide thereof, or a mixture thereof. The zeolite can be bound with the binder using any method known in the art. While not being limited thereto, the catalyst system component can comprise a zeolite and from 3 wt. % to 35 wt. % binder; alternatively, from 5 wt. % to 30 wt. % binder; or alternatively, from 10 wt. % to 30 wt. % binder. These weight percentages are based on the total weight of the catalyst system component.

In another aspect, the catalyst system component (or modified catalyst system component) can comprise a clay mineral having exchangeable cations and layers capable of expanding. Typical clay minerals include, but are not limited to, ion-exchangeable, layered aluminosilicates such as pillared clays. The clay materials encompass materials either in their natural state or that have been treated with various ions by wetting, ion exchange, or pillaring. Typically, the clay material can comprise clays that have been ion exchanged with large cations, including polynuclear, highly charged metal complex cations. However, the clay materials also encompass clays that have been ion exchanged with simple salts, including, but not limited to, salts of Al(III), Fe(II), Fe(III), and Zn(II) with ligands such as halide, acetate, sulfate, nitrate, or nitrite.

The catalyst system component (or modified catalyst system component) can comprise a pillared clay, which is used to refer to a clay material that has been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to an exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480.

Suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay comprises bentonite or montmorillonite; the principal component of bentonite is montmorillonite.

This invention also encompasses catalyst system components that further include chromium, vanadium, titanium, zirconium, hafnium, or a combination thereof, or other suitable transition metal, supported on the solid oxide, the chemically-treated solid oxide, or the zeolite (or bound zeolite). Thus, the catalyst system component can comprise a supported catalyst, such as a chromium catalyst (e.g., a supported chromium catalyst), a Ziegler-Natta catalyst (e.g., supported titanium catalyst), or a metallocene catalyst (e.g., a supported zirconium or hafnium catalyst).

Representative examples of catalyst system components containing chromium supported on a solid oxide support include, but are not limited to, chromium/silica, chromium/silica-titania, chromium/silica-zirconia, chromium/silica-titania-magnesia, chromium/silica-alumina, chromium/silica-coated alumina, chromium/aluminophosphate, chromium/alumina, chromium/alumina borate, and the like, or any combination thereof. In one aspect, for instance, the catalyst system component can comprise chromium/silica, while in another aspect, the catalyst system component can comprise chromium/silica-titania, and in yet another aspect, the catalyst system component can comprise chromium/silica-alumina and/or chromium/silica-coated alumina. In circumstances in which the catalyst system component comprises chromium/silica-titania (or chromium/silica-zirconia), any suitable amount of titanium (or zirconium) can be present, including from 0.1 to 20 wt. %, from 0.5 to 15 wt. %, from 1 to 10 wt. %, or from 1 to 6 wt. % titanium (or zirconium), based on the total weight of the respective catalyst system component.

Representative examples of catalyst system components containing chromium supported on a chemically-treated solid oxide include, but are not limited to, chromium/sulfated alumina, chromium/fluorided alumina, chromium/fluorided silica-alumina, chromium/fluorided silica-coated alumina, and the like, as well as combinations thereof.

While not particularly limited, the amount of chromium present on such supported chromium catalyst system components typically can range from 0.01 to 20 wt. %. In some aspects, the catalyst system component contains from 0.01 to 10 wt. %, from 0.05 to 15 wt. %, from 0.1 to 15 wt. %, or from 0.2 to 10 wt. % chromium, while in other aspects, the catalyst system component contains from 0.1 to 5 wt. %, from 0.5 to 5 wt. %, or from 0.5 to 2.5 wt. % chromium. These amounts are based on the total weight of the catalyst system component.

The catalyst system component can have any suitable shape or form, and such can depend on the type of process that the catalyst system component is intended to be used (e.g., fixed bed versus fluidized bed). Illustrative and non-limiting shapes and forms include powder, round or spherical (e.g., a sphere), ellipsoidal, bead, granule (e.g., regular and/or irregular), and the like, as well as any combination thereof.

Modified Catalyst Components

The result of the first method, the second method, the third method, and the fourth method of this invention can be a modified catalyst component. The modified catalyst component can be any type of catalyst system component disclosed above; thus, the modified catalyst component can comprise a solid oxide (e.g., silica or silica-coated alumina), a chemically-treated solid oxide (e.g., fluorided silica-coated alumina), a zeolite (e.g., a bound zeolite), a supported transition metal catalyst (e.g., a supported chromium catalyst such as chromium/silica, a Ziegler-Natta catalyst, a supported metallocene catalyst), and the like, as well as any combination thereof.

Likewise, the modified catalyst component can have the same wet particle density (e.g., in a range from 1.05 to 2.0 g/cc, or any range within that range), the same BET surface area (e.g., in a range from 50 to 1000 m$^2$/g, or any range within that range), and the same pore volume (e.g., in a range from 0.3 to 5 mL/g, or any range within that range) as that of the catalyst system component (before entering the hydrocyclone).

However, after the process steps in the first, second, third, and fourth methods, the particle size distribution of the catalyst system component has been modified. For instance, the amount of the modified catalyst component having a particle size of less than or equal to 20 μm, in one aspect, can be less than or equal to 4 wt. %; alternatively, less than or equal to 3 wt. %; alternatively, less than or equal to 2.5 wt. %; alternatively, less than or equal to 2 wt. %; or alternatively, less than or equal to 1.5 wt. %. In another aspect, the amount of the modified catalyst component having a particle size of less than or equal to 15 μm can be less than or equal to 4 wt. %; alternatively, less than or equal to 3 wt. %; alternatively, less than or equal to 2.5 wt. %; alternatively, less than or equal to 2 wt. %; or alternatively, less than or equal to 1.5 wt. %. In yet another aspect, the amount of the modified catalyst component having a particle size of less than or equal to 10 μm can be less than or equal to 4 wt. %; alternatively, less than or equal to 3 wt. %; alternatively, less than or equal to 2.5 wt. %; alternatively, less than or equal to 2 wt. %; or alternatively, less than or equal to 1.5 wt. %. In still another aspect, the amount of the modified catalyst component having a particle size of less than or equal to 5 μm can be less than or equal to 4 wt. %; alternatively, less than or equal to 3 wt. %; alternatively, less than or equal to 2.5 wt. %; alternatively, less than or equal to 2 wt. %; or alternatively, less than or equal to 1.5 wt. %. Minimum amounts can be any amount greater than zero, such as at least 0.05 wt. %, at least 0.1 wt. %, or at least 0.5 wt. %.

The modified catalyst component also can be further characterized by a ratio of d50/d5 from 1.5 to 3.6, such as from 1.5 to 3.3, from 1.8 to 3.6, from 2 to 3.5, or from 2 to 3.3, and the like. Additionally or alternatively, the modified catalyst component often can have a ratio of d95/d5 from 3 to 7.5, such as from 3 to 7, from 3.5 to 7.5, from 3.5 to 7, from 4 to 7.5, or from 4 to 7, and the like, although not limited thereto.

The d50 average particle size of the modified catalyst component can fall within a range from 20 to 200 μm. Other suitable ranges for the d50 average particle size of the modified catalyst component can include from 20 to 150 μm, from 20 to 60 μm, from 20 to 50 μm, from 25 to 140 μm, from 25 to 60 μm, from 25 to 50 μm, from 30 to 145 μm, from 30 to 45 µm, from 35 to 150 µm, from 35 to 100 µm, or from 35 to 50 µm, and the like.

Systems for Modifying Catalyst System Components

Systems for modifying a catalyst system component are provided herein. One such system can comprise (a) a hydrocyclone configured to separate a feed mixture containing a fluid (e.g., water) and from 1 to 15 wt. % of the catalyst system component, wherein a first amount of the catalyst system component in the feed mixture has a particle size of less than or equal to 20 µm (or less than or equal to 15 µm, 10 µm, or 5 µm), into (1) an overflow stream and (2) an underflow stream containing from 10 to 40 wt. % of the catalyst system component, wherein a second amount of the catalyst system component in the underflow stream has a particle size of less than or equal to 20 µm (or less than or equal to 15 µm, 10 µm, or 5 µm), and wherein the second amount is at least 50% less than the first amount, and (b) a spray dryer configured to dry the underflow stream to form a modified catalyst component. The features of this system can be the same as those described hereinabove for the first method, such as the selections for the catalyst system component, the selections for the fluid, the amount (wt. %) of the catalyst system component in the feed mixture, the spray drying options, and the particle size features of the catalyst system component in the feed mixture, the overflow stream, and the underflow stream, among others.

Generally, the hydrocyclone is configured to reduce the second amount of the catalyst system component in the underflow stream—having a particle size of less than or equal to 20 µm (or less than or equal to 15 µm, 10 µm, or 5 µm)—by at least 50% as compared to the first amount of the catalyst system component in the feed mixture—having a particle size of less than or equal to 20 µm (or less than or equal to 15 µm, 10 µm, or 5 µm). In some aspects, the reduction is at least 55%, at least 60%, at least 70%, at least 80%, or at least 90%.

Optionally, this system for modifying a catalyst system component can further include a particle size analyzer for determining the first amount and the second amount. Also optionally, this system can further include a controller for controlling the second amount of the catalyst system component in the underflow stream (having a particle size of less than or equal to 20 µm, 15 µm, 10 µm, or 5 µm) by adjusting a hydrocyclone processing parameter. While not limited thereto, the hydrocyclone processing parameter that can be adjusted based on the second amount can be the linear velocity of the feed mixture into the hydrocyclone, the temperature of the feed mixture, and/or the amount of the catalyst system component in the feed mixture (wt. % solids).

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

BET surface areas can be determined using the BET nitrogen adsorption method of Brunauer et al., *J. Am. Chem. Soc.*, 60, 309 (1938) as described in ASTM D1993-91. Total pore volumes can be determined in accordance with Halsey, G. D., *J. Chem. Phys.* (1948), 16, pp. 931. Particle size distributions were determined via laser diffraction in accordance with ISO 13320.

Table I summarizes the hydrocyclone experiments of Examples 1-4, in which a feed mixture containing water and from 4 to 8 wt. % of the catalyst system component was fed to the inlet of a hydrocyclone at a linear velocity of 8-13 ft/sec (2.4-4.0 m/sec). All experiments were performed at room temperature, typically in the 21-32° C. range). The catalyst system component for Examples 1-3 was a silica-coated alumina with a BET surface area of 430 m$^2$/g, a pore volume of 1.2 mL/g, and a wet particle density of approximately 1.45 g/cc. The catalyst system component in the feed mixture for Example 4 was fluorided silica-coated alumina (approximately 4 wt. % F). The particle size distributions of the catalyst system components in the feed mixtures of Examples 1-4 are summarized in Table I. Notably, approximately 4-8 wt. % of these catalyst system components were considered "fines" and had a particle sizes of less than 10 µm. Yield is based on pounds (lb) of the catalyst system component in the underflow per lb of the catalyst system component in the feed mixture.

The hydrocyclone was a KREBS® PC-1 hydrocyclone with an apex diameter of ⅛-inch (3.18 mm) and a 0.281-inch (7.12 mm) vortex finder. For Examples 1-4, an overflow stream containing 0.8-2 wt. % solids was discharged from the top of the hydrocyclone, and the overflow stream contained the vast majority of the very small particles: the d50 ranged from 7-12 µm, and 40-85 wt. % of the catalyst system component had particle sizes of less than 10 µm. The underflow stream contained 20-30 wt. % solids and was discharged from the bottom of the hydrocyclone. The "modified" catalyst system component in the underflow stream had a truncated particle size distribution: only 0.1-2.2 wt. % of the modified catalyst components were considered "fines" and had particle sizes of less than 10 µm. The significant difference in the particle size distribution of the modified catalyst component in the underflow stream as compared to the original particle size distribution of the catalyst system component in the feed mixture also was evident from the ratios of d50/d5 and d95/d5. In the feed mixture, the ratios of d50/d5 and d95/d5 for the catalyst system component were 4-5.3 and 8-10.3, respectively, while the ratios of d50/d5 and d95/d5 for the modified catalyst component in the underflow stream were 2-3 and 3.9-6, respectively. The end result was a surprisingly efficient removal of a large majority of the very small particles of less than 10 µm, forming the modified catalyst component with very few fines and a large increase in the d5 particle size.

Referring to Example 5 in Table I, the feed stream for Example 5 was a sample of the overflow stream from Example 2. The purpose was to recover additional amounts of the catalyst system component from the overflow stream, that might otherwise be lost, via a second pass through the hydrocyclone (or through a second hydrocyclone in series). The feed stream of Example 5 contained water and 1 wt. % of the catalyst system component having a d50 of 7.4 µm, and was fed to the inlet of the hydrocyclone at room temperature (and linear velocity of 8-13 ft/sec (2.4-4.0 m/sec)). The overflow stream of Example 5 contained 0.7 wt. % solids and the underflow stream contained 1.7 wt. % solids. Beneficially, the second hydrocyclone recovered additional amounts of the catalyst system component from the overflow stream and increased the overall yield. This effectively increased the overall yield for Example 2 from 85% to 92.5%. The total loss of fines material for Example 2 was reduced to ~7-8 wt. %.

The underflow streams containing the modified catalyst components of Examples 1-3 were subjected to pilot plant spray drying in the 750-1000° F. (399-538° C.) range and approximately 60 Hz. A small atomizer was used, which unfortunately increased fines and decreased the d50 by ~10 μm from the values in Table I. It is believed that a larger scale spray drying apparatus operating would not impact the particle size as significantly.

Table II summarizes the hydrocyclone experiments of Examples 6-11, which utilized a silica-coated alumina and were performed similarly to Examples 1-3. Example 6 utilized the same hydrocyclone as in Examples 1-3, the feed rate was in the 8-13 ft/sec (2.4-4.0 m/sec) range of linear velocity, and the feed inlet pressure was 60 psig (414 kPa). Example 7 utilized a Krebs Gmax hydrocyclone with an apex diameter of 3/16-inch (4.76 mm) and a 9/32-inch (7.14 mm) vortex finder. For Example 7, the feed rate was 3.5 ft/sec (1.1 m/sec) and the feed inlet pressure was 35 psig (241 kPa). Example 8 utilized a Compatible Components Corporation stainless steel hydrocyclone with an apex diameter of 1/2-inch (12.7 mm) and a 5/8-inch (15.8 mm) vortex finder. For Example 8, the feed rate was 13.7 ft/sec (4.2 m/sec) and the feed inlet pressure was 60 psig (414 kPa). Example 9 utilized a Compatible Components Corporation stainless steel hydrocyclone with an apex diameter of 3/8-inch (9.53 mm) and a 5/8-inch (15.8 mm) vortex finder. For Example 9, the feed rate was 13.2 ft/sec (4.0 m/sec) and the feed inlet pressure was 60 psig (414 kPa). Examples 10-11 utilized a Compatible Components Corporation stainless steel hydrocyclone with an apex diameter of 7/16-inch (11.1 mm) and a 5/8-inch (15.8 mm) vortex finder. For Example 10, the feed rate was 10.4 ft/sec (3.2 m/sec) and the feed inlet pressure was 35 psig (241 kPa), while for Example 11, the feed rate was 13.2 ft/sec (4.0 m/sec) and the feed inlet pressure was 60 psig (414 kPa).

Generally, Examples 6 and 9-11 demonstrate that the use of a larger apex and higher pressure and feed rate results in less loss of the coarse material. Examples 7-8 illustrate experiments in which the "modified" catalyst system component in the underflow stream contained in excess of 4 wt. % of particles with particle sizes of less than 10 μm (6.8-7.2 wt. %). Interestingly, the ratios of d50/d5 (4.5-4.7) and d95/d5 (9.8-10) for the modified catalyst system components of Examples 7-8 were much higher than those of Examples 6 and 9-11, in which the ratios of d50/d5 and d95/d5 for the modified catalyst system components were 2.3-3.3 and 4.5-7, respectively.

Table III summarizes the hydrocyclone experiments of Examples 12-13, which utilized a representative overflow stream from a first hydrocyclone as the feed mixture, similar to Example 5, in order to recover additional amounts of the catalyst system component from the overflow stream, that might otherwise be lost. Example 12 utilized a Compatible Components Corporation stainless steel hydrocyclone with an apex diameter of 3/8-inch (9.52 mm) and a 5/8-inch (15.8 mm) vortex finder, and Example 13 utilized a Compatible Components Corporation stainless steel hydrocyclone with an apex diameter of 1/4-inch (6.35 mm) and a 5/8-inch (15.8 mm) vortex finder. For Example 12, the feed rate was 12.9 ft/sec (3.9 m/sec) and the feed inlet pressure was 60 psig (414 kPa), while for Example 13, the feed rate was 11.5 ft/sec (3.5 m/sec) and the feed inlet pressure was 45 psig (310 kPa). The underflow streams from Examples 12-13 can be combined with the underflow from a first hydrocyclone to improve the overall yield of the desired catalyst component (e.g., with particle sizes greater than 10 μm).

TABLE 1

Summary of Examples 1-5

| Example | Yield % | Description | <10 μm (wt. %) | d5 (μm) | d10 (μm) | d50 (μm) | d90 (μm) | d95 (μm) |
|---|---|---|---|---|---|---|---|---|
| 1 | 84% | Feed | 4.8 | 10.3 | 17.0 | 43.7 | 72.4 | 85.8 |
| | | Underflow | 1.2 | 16.6 | 22.4 | 43.1 | 68.8 | 80.6 |
| | | Overflow | 79.8 | 4.2 | 4.7 | 7.5 | 11.8 | 13.6 |
| 2 | 85% | Feed | 5.4 | 9.5 | 15.7 | 42.0 | 68.9 | 81.3 |
| | | Underflow | 2.1 | 14.7 | 20.5 | 43.0 | 71.6 | 85.6 |
| | | Overflow | 82.9 | 4.2 | 4.7 | 7.3 | 11.3 | 12.9 |
| 3 | 87% | Feed | 6.2 | 8.8 | 14.2 | 41.3 | 68.4 | 79.9 |
| | | Underflow | 2.2 | 14.2 | 19.8 | 42.5 | 70.5 | 83.8 |
| | | Overflow | 82.1 | 4.2 | 4.8 | 7.4 | 11.4 | 13.0 |
| 4 | 81% | Feed | 7.8 | 7.5 | 12.2 | 39.6 | 66.3 | 77.2 |
| | | Underflow | 0.1 | 21.1 | 26.1 | 44.3 | 70.8 | 84.2 |
| | | Overflow | 41.8 | 4.0 | 4.8 | 11.7 | 24.6 | 29.7 |
| 5 | 52.3% | Feed | 81.1 | 4.3 | 4.8 | 7.4 | 11.6 | 13.5 |
| | | Underflow | 64.5 | 5.0 | 5.7 | 8.8 | 13.9 | 16.2 |
| | | Overflow | 92.5 | 3.9 | 4.4 | 6.4 | 9.5 | 10.7 |

| Example | Description | Solids (wt. %) | Span | d90/d10 | d95/d5 | d50/d5 |
|---|---|---|---|---|---|---|
| 1 | Feed | 4.7 | 1.27 | 4.26 | 8.30 | 4.23 |
| | Underflow | 24.0 | 1.08 | 3.08 | 4.86 | 2.60 |
| | Overflow | 0.9 | — | — | — | — |
| 2 | Feed | 5.4 | 1.27 | 4.39 | 8.55 | 4.42 |
| | Underflow | 24.7 | 1.19 | 3.50 | 5.84 | 2.93 |
| | Overflow | 1.0 | — | — | — | — |
| 3 | Feed | 5.0 | 1.31 | 4.82 | 9.13 | 4.72 |
| | Underflow | 25.8 | 1.19 | 3.57 | 5.89 | 2.99 |
| | Overflow | 0.8 | — | — | — | — |
| 4 | Feed | 7.4 | 1.36 | 5.44 | 10.30 | 5.29 |
| | Underflow | 25.3 | 1.01 | 2.71 | 3.99 | 2.10 |
| | Overflow | 1.8 | — | — | — | — |

TABLE 1-continued

Summary of Examples 1-5

| | | | | | | |
|---|---|---|---|---|---|---|
| 5 | Feed | 1.0 | 0.92 | 2.41 | 3.18 | 1.74 |
| | Underflow | 1.7 | 0.93 | 2.42 | 3.21 | 1.75 |
| | Overflow | 0.7 | — | — | — | — |

TABLE II

Summary of Examples 6-11

| Example | Description | <10 μm (wt. %) | d5 (μm) | d10 (μm) | d50 (μm) | d90 (μm) | d95 (μm) |
|---|---|---|---|---|---|---|---|
| 6 | Feed | 9.9 | 6.5 | 10.0 | 36.6 | 65.6 | 79.1 |
| | Underflow | 0.6 | 18.1 | 23.1 | 42.3 | 69.5 | 82.9 |
| | Overflow | 59.0 | 4.0 | 4.7 | 8.9 | 16.4 | 19.5 |
| 7 | Feed | 13.3 | 5.5 | 8.0 | 34.5 | 64.2 | 77.7 |
| | Underflow | 6.8 | 8.2 | 13.2 | 38.3 | 67.2 | 81.0 |
| | Overflow | 45.7 | 3.8 | 4.5 | 11.2 | 39.5 | 51.6 |
| 8 | Feed | 14.7 | 5.2 | 7.5 | 32.7 | 62.2 | 76.2 |
| | Underflow | 7.2 | 7.8 | 12.6 | 35.8 | 64.0 | 77.8 |
| | Overflow | 61.7 | 3.6 | 4.2 | 8.2 | 25.0 | 34.8 |
| 9 | Feed | 14.7 | 5.2 | 7.5 | 33.0 | 63.1 | 77.2 |
| | Underflow | 1.4 | 16.6 | 21.4 | 39.3 | 65.8 | 79.2 |
| | Overflow | 53.7 | 3.7 | 4.4 | 9.4 | 22.6 | 29.7 |
| 10 | Feed | 15.1 | 5.1 | 7.3 | 32.7 | 62.9 | 77.2 |
| | Underflow | 3.6 | 12.3 | 18.2 | 39.0 | 66.3 | 80.0 |
| | Overflow | 55.0 | 3.7 | 4.4 | 9.2 | 23.9 | 32.3 |
| 11 | Feed | 15.1 | 5.1 | 7.3 | 32.7 | 62.9 | 77.2 |
| | Underflow | 3.8 | 11.8 | 17.3 | 38.4 | 65.9 | 79.7 |
| | Overflow | 61.5 | 3.7 | 4.3 | 8.4 | 20.8 | 28.5 |

| Example | Description | Solids (wt. %) | Span | d90/d10 | d95/d5 | d50/d5 |
|---|---|---|---|---|---|---|
| 6 | Feed | 5.5 | 1.52 | 6.25 | 12.10 | 5.60 |
| | Underflow | 24.8 | 1.09 | 3.01 | 4.58 | 2.34 |
| | Overflow | 1.2 | — | — | — | — |
| 7 | Feed | 4.7 | 1.63 | 7.99 | 14.20 | 6.31 |
| | Underflow | 15.7 | 1.41 | 5.08 | 9.88 | 4.67 |
| | Overflow | 1.4 | — | — | — | — |
| 8 | Feed | 5.0 | 1.67 | 8.33 | 14.62 | 6.28 |
| | Underflow | 11.9 | 1.43 | 5.07 | 9.94 | 4.58 |
| | Overflow | 1.5 | — | — | — | — |
| 9 | Feed | 5.0 | 1.77 | 8.46 | 14.85 | 6.35 |
| | Underflow | 23.4 | 1.13 | 3.08 | 4.78 | 2.37 |
| | Overflow | 1.7 | — | — | — | — |
| 10 | Feed | 5.0 | 1.70 | 8.62 | 15.11 | 6.40 |
| | Underflow | 15.6 | 1.23 | 3.65 | 6.52 | 3.18 |
| | Overflow | 1.6 | — | — | — | — |
| 11 | Feed | 5.0 | 1.70 | 8.62 | 15.11 | 6.40 |
| | Underflow | 16.9 | 1.26 | 3.80 | 6.73 | 3.24 |
| | Overflow | 1.5 | — | — | — | — |

TABLE III

Summary of Examples 12-13

| Example | Description | <10 μm (wt. %) | d5 (μm) | d10 (μm) | d50 (μm) | d90 (μm) | d95 (μm) | Solids (wt. %) |
|---|---|---|---|---|---|---|---|---|
| 12 | Feed | 42.2 | 3.8 | 4.6 | 11.8 | 32.4 | 42.8 | 2.1 |
| | Underflow | 12.3 | 5.5 | 8.7 | 22.5 | 47.7 | 60.2 | 10.8 |
| | Overflow | 68.3 | 3.6 | 4.2 | 7.8 | 14.9 | 17.9 | 1.4 |
| 13 | Feed | 42.4 | 3.8 | 4.6 | 11.8 | 32.4 | 42.7 | 2.3 |
| | Underflow | 3.7 | 11.8 | 15.4 | 29.6 | 54.2 | 66.3 | 20.7 |
| | Overflow | 57.8 | 3.7 | 4.3 | 8.9 | 17.7 | 21.3 | 1.8 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A method comprising: (i) introducing a feed mixture containing a fluid and from 1 to 15 wt. % of a catalyst system component into an inlet of a hydrocyclone, wherein from 4 to 20 wt. % of the catalyst system component has a particle size of less than or equal to 20 µm; (ii) discharging from the hydrocyclone an overflow stream containing from 0.1 to 5 wt. % solids and an underflow stream containing from 10 to 40 wt. % solids; and (iii) spray drying the underflow stream to form a modified catalyst component.

Aspect 2. A method comprising: (I) introducing a feed mixture containing a fluid and from 1 to 15 wt. % of a catalyst system component having a wet particle density of from 1.05 to 2.0 g/cc into an inlet of a hydrocyclone at a linear velocity of from 2 to 20 ft/sec (0.6 to 6.1 m/sec), wherein from 4 to 20 wt. % of the catalyst system component has a particle size of less than or equal to 20 µm; and (II) discharging from the hydrocyclone an overflow stream containing from 0.1 to 5 wt. % solids and an underflow stream containing from 10 to 40 wt. % solids.

Aspect 3. The method defined in aspect 2, further comprising a step of spray drying the underflow stream to form a modified catalyst component.

Aspect 4. A method comprising: (a) introducing a feed mixture containing a fluid and from 1 to 15 wt. % of a catalyst system component into a first inlet of a first hydrocyclone, wherein from 4 to 20 wt. % of the catalyst system component has a particle size of less than or equal to 20 µm; (b) discharging from the first hydrocyclone a first overflow stream containing from 0.1 to 5 wt. % solids and a first underflow stream containing from 10 to 40 wt. % solids; (c) introducing the first overflow stream into a second inlet of a second hydrocyclone; and (d) discharging from the second hydrocyclone a second overflow stream containing from 0.05 to 2.5 wt. % solids and a second underflow stream containing from 0.5 to 15 wt. % solids.

Aspect 5. The method defined in aspect 4, further comprising a step of spray drying the first underflow stream and/or the second underflow stream to form a modified catalyst component.

Aspect 6. A method comprising: (a) introducing a feed mixture containing a fluid and from 1 to 15 wt. % of a catalyst system component into a first inlet of a first hydrocyclone, wherein from 4 to 20 wt. % of the catalyst system component has a particle size of less than or equal to 20 µm; (b) discharging from the first hydrocyclone a first overflow stream containing from 0.1 to 5 wt. % solids and a first underflow stream containing from 10 to 40 wt. % solids; (c) introducing the first underflow stream into a second inlet of a second hydrocyclone; and (d) discharging from the second hydrocyclone a second overflow stream containing from 0.1 to 15 wt. % solids and a second underflow stream containing from 10 to 40 wt. % solids.

Aspect 7. The method defined in aspect 6, further comprising a step of spray drying the second overflow stream to form a modified catalyst component.

Aspect 8. The method defined in any one of aspects 1-7, wherein the fluid comprises water.

Aspect 9. The method defined in any one of aspects 1-7, wherein the fluid comprises an organic oxygen-containing compound.

Aspect 10. The method defined in any one of aspects 1-7, wherein the fluid comprises a mixture of water and an organic oxygen-containing compound, e.g., a mixture of water and an alcohol compound.

Aspect 11. The method defined in aspect 9 or 10, wherein the organic oxygen-containing compound comprises an alcohol compound, a ketone compound, an aldehyde compound, an ether compound, or a combination thereof.

Aspect 12. The method defined in any one of aspects 1-7, wherein the fluid comprises a hydrocarbon compound.

Aspect 13. The method defined in any one of aspects 1-7, wherein the fluid comprises an alkane compound.

Aspect 14. The method defined in any one of aspects 1-7, wherein the fluid comprises an aromatic compound.

Aspect 15. The method defined in any one of the preceding aspects, wherein a temperature of the feed mixture (or the stream) entering the inlet of the hydrocyclone (or the first inlet of first hydrocyclone, or the second inlet of the second hydrocyclone) is any suitable temperature or any temperature disclosed herein, e.g., from 10° C. to 80° C., from 15° C. to 60° C., from 15° C. to 40° C., or from 20° C. to 45° C.

Aspect 16. The method defined in any one of the preceding aspects, wherein a linear velocity of the feed mixture (or the stream) entering the inlet of the hydrocyclone (or the first inlet of first hydrocyclone, or the second inlet of the second hydrocyclone) is any suitable linear velocity or a linear velocity in any range disclosed herein, e.g., from 2 to 20 ft/sec (0.6 to 6.1 m/sec), from 5 to 20 ft/sec (1.5 to 6.1 m/sec), from 5 to 15 ft/sec (1.5 to 4.6 m/sec), from 7 to 14 ft/sec (2.1 to 4.3 m/sec), or from 8 to 12 ft/sec (2.4 to 3.7 m/sec).

Aspect 17. The method defined in any one of the preceding aspects, further comprising the steps of: a) determining a particle size feature of the catalyst system component in the feed mixture (e.g., using in-process or off-line particle size analysis); and b) adjusting a hydrocyclone processing parameter based on the particle size feature.

Aspect 18. The method defined in any one of the preceding aspects, further comprising the steps of: A) determining a particle size feature of the catalyst system component in the underflow stream (or the first underflow stream, or the second underflow stream) and/or in the overflow stream (or the first overflow stream, or the second overflow stream); and B) adjusting a hydrocyclone processing parameter based on the particle size feature.

Aspect 19. The method defined in aspect 17 or 18, wherein the hydrocyclone processing parameter comprises the linear velocity, the temperature, the amount of the catalyst system component in the feed mixture (wt. % solids), or any combination thereof.

Aspect 20. The method defined in any one of aspects 17-19, wherein the particle size feature comprises the amount of the catalyst system component having a particle size of less than or equal to 20 µm, less than or equal to 15 µm, less than or equal to 10 µm, or less than or equal to 5 µm; the d50 average particle size; the ratio of d50/d5; the ratio of d95/d5; or any combination thereof.

Aspect 21. The method defined in any one of the preceding aspects, wherein a separation efficiency of the method is any suitable separation efficiency or a separation efficiency in any range disclosed herein, e.g., from 80 to 98%, from 80 to 95%, from 80 to 92%, from 82 to 95%, from 82 to 92%, from 85 to 98%, from 85 to 95%, or from 85 to 92%.

Aspect 22. The method defined in any one of the preceding aspects, wherein the feed mixture contains the fluid and any suitable amount of the catalyst system component (% solids) or an amount in any range disclosed herein, e.g., from 2 to 14 wt. %, from 2 to 12 wt. %, from 3 to 15 wt. %, from 3 to 12 wt. %, from 4 to 12 wt. %, from 4 to 10 wt. %, or from 4 to 8 wt. %.

Aspect 23. The method defined in any one of the preceding aspects, wherein the amount of the catalyst system component having a particle size of less than or equal to 20 µm, or less than or equal to 15 µm, or less than or equal to 10 µm, or less than or equal to 5 µm, in the feed mixture is any suitable amount or an amount in any range disclosed herein, e.g., from 5 to 16 wt. %, from 6 to 18 wt. %, from 6 to 12 wt. %, from 7 to 20 wt. %, from 7 to 15 wt. %, or from 8 to 14 wt. %.

Aspect 24. The method defined in any one of the preceding aspects, wherein the amount of the catalyst system component having a particle size of less than or equal to 20 µm, or less than or equal to 15 µm, or less than or equal to 10 µm, or less than or equal to 5 µm, in the overflow stream (or the first overflow stream, or the second overflow stream) is any suitable amount or an amount in any range disclosed herein, e.g., from 30 to 95 wt. %, from 30 to 88 wt. %, from 35 to 95 wt. %, from 35 to 90 wt. %, from 40 to 95 wt. %, or from 40 to 85 wt. %.

Aspect 25. The method defined in any one of the preceding aspects, wherein the catalyst system component in the overflow stream (or the first overflow stream, or the second overflow stream) has any suitable d50 average particle size or a d50 average particle size in any range disclosed herein, e.g., from 3 to 35 µm, from 3 to 18 µm, from 3 to 15 µm, from 3 to 12 µm, from 4 to 30 µm, from 4 to 15 µm, from 5 to 15 µm, or from 6 to 12 µm.

Aspect 26. The method defined in any one of the preceding aspects, wherein the catalyst system component in the feed mixture has any suitable ratio of d50/d5 or a ratio of d50/d5 in any range disclosed herein, e.g., from 4 to 8, from 4 to 7, from 4 to 6.5, from 4 to 6, or from 4.5 to 6.5.

Aspect 27. The method defined in any one of the preceding aspects, wherein the catalyst system component in the feed mixture has any suitable ratio of d95/d5 or a ratio of d95/d5 in any range disclosed herein, e.g., from 8 to 20, from 8 to 18, from 8 to 16, from 8.5 to 18, or from 8.5 to 16.

Aspect 28. A modified catalyst component (composition) characterized by: i) a wet particle density in a range from 1.05 to 2.0 g/cc; ii) a BET surface area in a range from 50 to 1000 $m^2/g$; iii) a d50 average particle size in a range from 20 to 200 µm; iv) a ratio of d50/d5 in a range from 1.5 to 3.6; and v) a ratio of d95/d5 in a range from 3 to 7.5; wherein less than or equal to 4 wt. % of the modified catalyst component has a particle size of less than or equal to 20 µm.

Aspect 29. The method or component defined in any one of the preceding aspects, wherein the catalyst system component (or the modified catalyst component) has any suitable pore volume (total) or a pore volume (total) in any range disclosed herein, e.g., from 0.3 to 5 mL/g, from 0.5 to 5 mL/g, from 0.3 to 3 mL/g, from 0.5 to 2 mL/g, from 0.5 to 1.8 mL/g, or from 0.7 to 1.6 mL/g.

Aspect 30. The method or component defined in any one of the preceding aspects, wherein the catalyst system component (or the modified catalyst component) has any suitable BET surface area or a BET surface area in any range disclosed herein, e.g., from 50 to 1000 $m^2/g$, from 100 to 700 $m^2/g$, from 100 to 400 $m^2/g$, from 150 to 500 $m^2/g$, or from 200 to 450 $m^2/g$.

Aspect 31. The method or component defined in any one of the preceding aspects, wherein the catalyst system component (or the modified catalyst component) has any suitable wet particle density or a wet particle density in any range disclosed herein, e.g., from 1.05 to 2.0 g/cc, from 1.05 to 1.5 g/cc, from 1.2 to 2.0 g/cc, from 1.2 to 1.8 g/cc, from 1.2 to 1.6 g/cc, from 1.3 to 1.9 g/cc, from 1.3 to 1.7 g/cc, or from 1.3 to 1.5 g/cc.

Aspect 32. The method or component defined in any one of the preceding aspects, wherein the amount of the catalyst system component in the underflow stream (or the amount of the modified catalyst component) having a particle size of less than or equal to 20 µm, or less than or equal to 15 µm, or less than or equal to 10 µm, or less than or equal to 5 µm, is any suitable amount or an amount in any range disclosed herein, e.g., less than or equal to 4 wt. %, less than or equal to 3 wt. %, less than or equal to 2.5 wt. %, less than or equal to 2 wt. %, or less than or equal to 1.5 wt. %.

Aspect 33. The method or component defined in any one of the preceding aspects, wherein the catalyst system component in the feed mixture (or in the underflow stream) (or the modified catalyst component) has any suitable d50 average particle size or a d50 average particle size in any range disclosed herein, e.g., from 20 to 200 µm, from 20 to 150 µm, from 20 to 60 µm, from 20 to 50 µm, from 25 to 140 µm, from 25 to 60 µm, from 25 to 50 µm, from 30 to 145 µm, from 30 to 45 µm, from 35 to 150 µm, from 35 to 100 µm, or from 35 to 50 µm.

Aspect 34. The method or component defined in any one of the preceding aspects, wherein the catalyst system component in the underflow stream (or the modified catalyst component) has any suitable ratio of d50/d5 or a ratio of d50/d5 in any range disclosed herein, e.g., from 1.5 to 3.6, from 1.5 to 3.3, from 1.8 to 3.6, from 2 to 3.5, or from 2 to 3.3.

Aspect 35. The method or component defined in any one of the preceding aspects, wherein the catalyst system component in the underflow stream (or the modified catalyst component) has any suitable ratio of d95/d5 or a ratio of d95/d5 in any range disclosed herein, e.g., from 3 to 7.5, from 3 to 7, from 3.5 to 7.5, from 3.5 to 7, from 4 to 7.5, or from 4 to 7.

Aspect 36. The method or component defined in any one of aspects 1-35, wherein the catalyst system component (or the modified catalyst component) comprises any suitable solid oxide or any solid oxide disclosed herein, e.g., silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, alumina borate, silica-boria, aluminophosphate-silica, titania-zirconia, or any combination thereof.

Aspect 37. The method or component defined in any one of aspects 1-35, wherein the catalyst system component (or the modified catalyst component) comprises silica, silica-alumina, silica-coated alumina, silica-titania, silica-titania-magnesia, silica-zirconia, silica-magnesia, silica-boria, aluminophosphate-silica, alumina, alumina borate, or any combination thereof.

Aspect 38. The method or component defined in any one of aspects 1-35, wherein the catalyst system component (or the modified catalyst component) comprises a chemically-treated solid oxide comprising a solid oxide (e.g., as above, such as silica, alumina, silica-alumina, silica-titania, silica-zirconia, silica-yttria, aluminophosphate, zirconia, titania, thoria, or stania) treated with an electron-withdrawing anion.

Aspect 39. The method or component defined in aspect 38, wherein the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, or any combination thereof.

Aspect 40. The method or component defined in aspect 38 or 39, wherein the chemically-treated solid oxide contains from 1 to 30 wt. %, from 2 to 20 wt. %, from 2 to 15 wt. %, from 2 to 10 wt. %, or from 3 to 10 wt. %, of the electron-withdrawing anion, based on the total weight of the chemically-treated solid oxide.

Aspect 41. The method or component defined in any one of aspects 1-35, wherein the catalyst system component (or the modified catalyst component) comprises a chemically-treated solid oxide comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 42. The method or component defined in any one of aspects 1-35, wherein the catalyst system component (or the modified catalyst component) comprises a zeolite.

Aspect 43. The method or component defined in any one of aspects 1-35, wherein the catalyst system component (or the modified catalyst component) comprises a medium pore zeolite, a large pore zeolite, or a combination thereof.

Aspect 44. The method or component defined in aspect 42 or 43, wherein the zeolite comprises a ZSM-5 zeolite, a ZSM-11 zeolite, an EU-1 zeolite, a ZSM-23 zeolite, a ZSM-57 zeolite, an ALPO4-11 zeolite, an ALPO4-41 zeolite, a Ferrierite framework type zeolite, or a combination thereof.

Aspect 45. The method or component defined in any one of aspects 1-35, wherein the catalyst system component (or the modified catalyst component) comprises an L-zeolite, a Y-zeolite, a mordenite, an omega zeolite, and/or a beta zeolite.

Aspect 46. The method or component defined in any one of aspects 42-45, wherein the catalyst system component comprises (or the modified catalyst component) the zeolite and any suitable amount of binder or an amount in any range disclosed herein, e.g., from 3 wt. % to 35 wt. %, or from 5 wt. % to 30 wt. % binder, based on the weight of the respective catalyst system component.

Aspect 47. The method or component defined in any one of aspects 1-46, wherein the catalyst system component (or the modified catalyst component) further comprises chromium, vanadium, titanium, zirconium, hafnium, or a combination thereof, supported on the solid oxide, the chemically-treated solid oxide, or the zeolite (or bound zeolite).

Aspect 48. The method or component defined in any one of aspects 1-35, wherein the catalyst system component (or the modified catalyst component) comprises a chromium/silica catalyst, a chromium/silica-titania catalyst, a chromium/silica-titania-magnesia catalyst, a chromium/silica-alumina catalyst, a chromium/silica-coated alumina catalyst, a chromium/aluminophosphate catalyst, a chromium/alumina catalyst, a chromium/alumina borate catalyst, or any combination thereof.

Aspect 49. The method or component defined in any one of aspects 1-35, wherein the catalyst system component (or the modified catalyst component) comprises a chromium/sulfated alumina catalyst, a chromium/fluorided alumina catalyst, a chromium/fluorided silica-alumina catalyst, a chromium/fluorided silica-coated alumina catalyst, or any combination thereof.

Aspect 50. The method or component defined in any one of aspects 47-49, wherein the catalyst system component (or the modified catalyst component) contains any suitable amount of chromium or an amount in any range disclosed herein, e.g., from 0.01 to 20 wt. %, from 0.01 to 10 wt. %, from 0.05 to 15 wt. %, from 0.1 to 15 wt. %, from 0.2 to 10 wt. %, from 0.1 to 5 wt. %, from 0.5 to 5 wt. %, or from 0.5 to 2.5 wt. % of chromium, based on the weight of the respective catalyst system component.

Aspect 51. A system for modifying a catalyst system component, the system comprising: (a) a hydrocyclone configured to separate a feed mixture containing a fluid (e.g., water) and from 1 to 15 wt. % of the catalyst system component, wherein a first amount of the catalyst system component in the feed mixture has a particle size of less than or equal to 20 µm (or less than or equal to 15 µm, 10 µm, or 5 µm), into (1) an overflow stream and (2) an underflow stream containing from 10 to 40 wt. % of the catalyst system component, wherein a second amount of the catalyst system component in the underflow stream has a particle size of less than or equal to 20 µm (or less than or equal to 15 µm, 10 µm, or 5 µm), and wherein the second amount is at least 50% less than the first amount; and (b) a spray dryer configured to dry the underflow stream to form a modified catalyst component.

Aspect 52. The system defined in aspect 51, further comprising a particle size analyzer for determining the first amount and the second amount.

Aspect 53. The system defined in aspect 51 or 52, further comprising a controller for controlling the second amount of the catalyst system component in the underflow stream (having a particle size of less than or equal to 20 µm, 15 µm, 10 µm, or 5 µm) by adjusting a hydrocyclone processing parameter.

We claim:

1. A method comprising:
   (I) introducing a feed mixture containing a liquid and from 1 to 15 wt. % of a catalyst system component having a wet particle density of from 1.05 to 2.0 g/cc into an inlet of a hydrocyclone at a linear velocity of from 2 to 20 ft/sec (0.6 to 6.1 m/sec), wherein from 4 to 20 wt. % of the catalyst system component has a particle size of less than or equal to 20 µm; and
   (II) discharging from the hydrocyclone an overflow stream containing from 0.1 to 5 wt. % solids and an underflow stream containing from 10 to 40 wt. % solids.

2. The method of claim 1, further comprising a step of spray drying the underflow stream to form a modified catalyst component.

3. The method of claim 1, further comprising the steps of:
   a) determining a particle size feature of the catalyst system component in the feed mixture, and b) adjusting a hydrocyclone processing parameter based on the particle size feature; and/or
   A) determining a particle size feature of the catalyst system component in the underflow stream, and B) adjusting a hydrocyclone processing parameter based on the particle size feature.

4. The method of claim 1, further comprising the steps of:
   (III) introducing the overflow stream into a second inlet of a second hydrocyclone;
   (IV) discharging from the second hydrocyclone a second overflow stream containing from 0.05 to 2.5 wt. % solids and a second underflow stream containing from 0.5 to 15 wt. % solids; and
   (V) spray drying the first underflow stream and/or the second underflow stream to form a modified catalyst component.

5. The method of claim 1, further comprising the steps of:
   (III) introducing the underflow stream into a second inlet of a second hydrocyclone;
   (IV) discharging from the second hydrocyclone a second overflow stream containing from 0.1 to 15 wt. % solids and a second underflow stream containing from 10 to 40 wt. % solids; and
   (V) spray drying the second overflow stream to form a modified catalyst component.

6. The method of claim 1, wherein the liquid comprises water.

7. The method of claim 1, wherein the feed mixture contains the liquid and from 4 to 10 wt. % of the catalyst system component.

8. The method of claim 1, wherein:
the catalyst system component in the feed mixture has a ratio of d50/d5 in a range from 4 to 8 and a ratio of d95/d5 in a range from 8 to 20; and
the catalyst system component in the underflow stream has a ratio of d50/d5 in a range from 1.5 to 3.6 and a ratio of d95/d5 in a range from 3 to 7.5.

9. The method of claim 1, wherein:
the catalyst system component in the feed mixture has a ratio of d50/d5 in a range from 4 to 6.5 and a ratio of d95/d5 in a range from 8 to 16; and
the catalyst system component in the underflow stream has a ratio of d50/d5 in a range from 2 to 3.5 and a ratio of d95/d5 in a range from 4 to 7.

10. The method of claim 1, wherein:
an amount of the catalyst system component having a particle size of less than or equal to 10 μm in the feed mixture is in a range from 5 to 16 wt. %; and
an amount of the catalyst system component having a particle size of less than or equal to 10 μm in the overflow stream is in a range from 35 to 90 wt. %.

11. The method of claim 10, wherein an amount of the catalyst system component having a particle size of less than or equal to 10 μm in the underflow stream is less than or equal to 4 wt. %.

12. The method of claim 1, wherein:
an amount of the catalyst system component having a particle size of less than or equal to 10 μm in the feed mixture is in a range from 7 to 15 wt. %; and
an amount of the catalyst system component having a particle size of less than or equal to 10 μm in the underflow stream is less than or equal to 3 wt. %.

13. The method of claim 12, wherein the catalyst system component in the overflow stream has a d50 average particle size in a range from 3 to 12 μm.

14. The method of claim 13, wherein:
the wet particle density is in a range from 1.2 to 1.8 g/cc; and
the catalyst system component in the feed mixture has a BET surface area in a range from 50 to 1000 $m^2/g$ and a d50 average particle size in a range from 25 to 60 μm.

15. A method comprising:
(i) introducing a feed mixture containing a liquid and from 1 to 15 wt. % of a catalyst system component into an inlet of a hydrocyclone, wherein from 4 to 20 wt. % of the catalyst system component has a particle size of less than or equal to 20 μm;
(ii) discharging from the hydrocyclone an overflow stream containing from 0.1 to 5 wt. % solids and an underflow stream containing from 10 to 40 wt. % solids; and
(iii) spray drying the underflow stream to form a modified catalyst component.

16. The method of claim 15, wherein:
the liquid comprises water; and
the catalyst system component has a wet particle density of from 1.2 to 1.8 g/cc.

17. The method of claim 15, wherein the catalyst system component comprises a solid oxide, a chemically-treated solid oxide, a zeolite, or a combination thereof.

18. The method of claim 15, wherein the feed mixture contains the liquid and from 4 to 10 wt. % of the catalyst system component.

19. The method of claim 15, wherein:
an amount of the catalyst system component having a particle size of less than or equal to 10 μm in the feed mixture is in a range from 5 to 16 wt. %; and
an amount of the catalyst system component having a particle size of less than or equal to 10 μm in the overflow stream is in a range from 35 to 90 wt. %.

20. The method of claim 19, wherein an amount of the catalyst system component having a particle size of less than or equal to 10 μm in the underflow stream is less than or equal to 4 wt. %.

* * * * *